(12) United States Patent
Kuchibhotla et al.

(10) Patent No.: US 9,185,697 B2
(45) Date of Patent: Nov. 10, 2015

(54) METHOD AND APPARATUS FOR DEVICE-TO-DEVICE COMMUNICATION

(71) Applicant: MOTOROLA MOBILITY LLC, Libertyville, IL (US)

(72) Inventors: Ravi Kuchibhotla, Gurnee, IL (US); Robert T. Love, Barrington, IL (US); Ajit Nimbalker, Buffalo Grove, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 165 days.

(21) Appl. No.: 13/727,683

(22) Filed: Dec. 27, 2012

(65) Prior Publication Data

US 2014/0185530 A1 Jul. 3, 2014

(51) Int. Cl.
*H04W 4/00* (2009.01)
*H04W 72/04* (2009.01)
*H04W 76/02* (2009.01)

(52) U.S. Cl.
CPC ........ *H04W 72/0446* (2013.01); *H04W 76/023* (2013.01)

(58) Field of Classification Search
USPC .......... 370/235–331; 455/411–450, 509–522; 709/221–229
See application file for complete search history.

(56) References Cited

U.S. PATENT DOCUMENTS

| | | | |
|---|---|---|---|
| 6,700,867 B2 | 3/2004 | Classon et al. | |
| 7,012,949 B2 | 3/2006 | Uesugi | |
| 8,040,815 B2 | 10/2011 | Silk et al. | |
| 8,068,454 B2 | 11/2011 | Bonta et al. | |
| 8,248,959 B2 | 8/2012 | Olexa | |
| 2008/0320353 A1 | 12/2008 | Blankenship et al. | |
| 2009/0180034 A1 | 7/2009 | Treigherman | |
| 2009/0232050 A1 | 9/2009 | Shen et al. | |
| 2010/0050034 A1 | 2/2010 | Che et al. | |
| 2010/0149813 A1 | 6/2010 | Powell | |
| 2010/0268775 A1* | 10/2010 | Doppler et al. | ............... 709/204 |
| 2011/0188485 A1 | 8/2011 | Fodor et al. | |

(Continued)

FOREIGN PATENT DOCUMENTS

| | | |
|---|---|---|
| EP | 2395692 A2 | 12/2011 |
| KR | 20110127080 A | 11/2011 |

(Continued)

OTHER PUBLICATIONS

Fodor, Gábor, et al. "Design aspects of network assisted device-to-device communications." Communications Magazine, IEEE 50.3 (2012): 170-177.

(Continued)

*Primary Examiner* — Man Phan
(74) *Attorney, Agent, or Firm* — Lerner, David, Littenberg, Krumholz & Mentlik, LLP

(57) ABSTRACT

A first user equipment (UE) and a second UE communicate with a network element (e.g., an eNB) over a carrier (e.g., an uplink or downlink cellular carrier). The first and second UEs also engage in D2D communication using resources of the carrier that have been allocated to them by the network entity. Using the allocated resources, the first and second UEs communicate using a subframe that has a first set of symbols in during which the first UE transmits, a second set of symbols during which the second UE transmits, and a guard interval between the first and second UEs.

28 Claims, 17 Drawing Sheets

(56) References Cited

U.S. PATENT DOCUMENTS

| | | | |
|---|---|---|---|
| 2012/0163252 A1 | 6/2012 | Ahn et al. | |
| 2012/0250636 A1* | 10/2012 | Wang et al. | 370/329 |
| 2013/0064146 A1 | 3/2013 | Ahn et al. | |
| 2013/0201954 A1* | 8/2013 | Gao et al. | 370/329 |
| 2013/0252654 A1* | 9/2013 | Dimou et al. | 455/509 |
| 2013/0308490 A1* | 11/2013 | Lim et al. | 370/252 |
| 2014/0086152 A1* | 3/2014 | Bontu et al. | 370/329 |
| 2014/0086153 A1* | 3/2014 | Bontu et al. | 370/329 |
| 2014/0122607 A1* | 5/2014 | Fodor et al. | 709/204 |
| 2014/0148177 A1* | 5/2014 | Ratasuk et al. | 455/450 |
| 2014/0185529 A1* | 7/2014 | Lim et al. | 370/328 |
| 2014/0235234 A1* | 8/2014 | Jang et al. | 455/426.1 |

FOREIGN PATENT DOCUMENTS

| | | |
|---|---|---|
| WO | 2005039127 A1 | 4/2005 |
| WO | 2009118595 A2 | 10/2009 |
| WO | 2012047457 A1 | 4/2012 |

OTHER PUBLICATIONS

Doppler, Klaus, et al. "Device-to-device communication as an underlay to LTE-advanced networks." Communications Magazine, IEEE 47.12 (2009): 42-49.

Lei, Lei, et al. "Operator controlled device-to-device communications in LTE-advanced networks." Wireless Communications, IEEE 19.3 (2012): 96-104.

3GPP TSG RAN #65, R1-111863, Change Request on "Rate maching parameters for CA" NTT DoCoMo et al., Barcelona, Spain May 9-13, 2011, all pages.

International Search Report for PCT/US2013/73469 dated May 27, 2014.

* cited by examiner

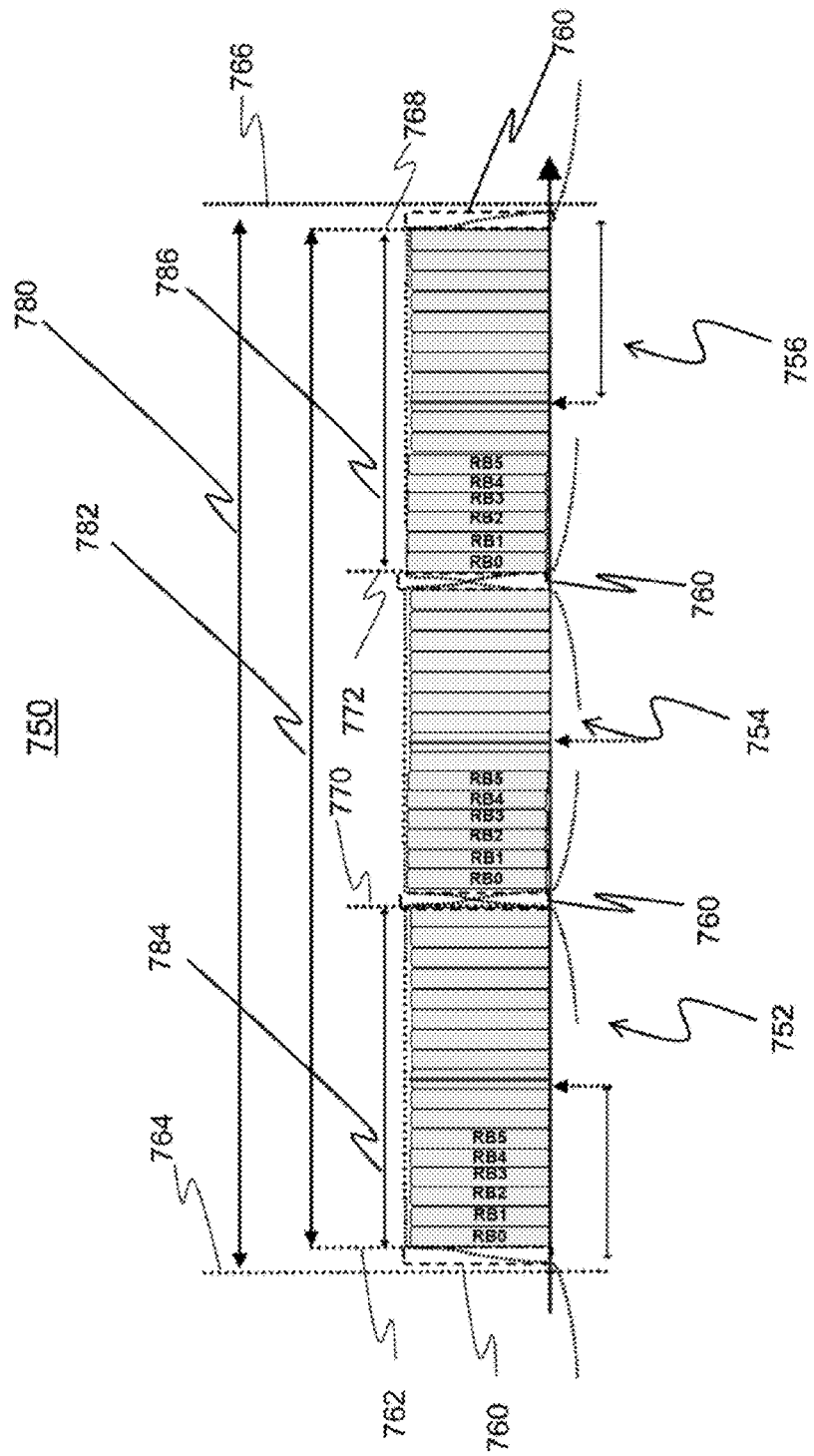

METHOD AND APPARATUS FOR DEVICE-TO-DEVICE COMMUNICATION

TECHNICAL FIELD

The disclosure relates to device-to-device communication in a wireless network.

BACKGROUND

The demand for data capacity in wireless networks has increased dramatically with the widespread use of smartphones and tablet computers. In addition to traditional voice services, consumers now expect to be able to use their wireless devices to watch streaming video, often in a high-definition format, play on-line games in real-time, and transfer large files. This has put additional load on wireless networks and, in spite of advances in cellular technology (e.g., the deployment of 4G networks, the use of newer versions of the IEEE 802.11 family of standards), capacity is still an issue that providers have to consider.

BRIEF DESCRIPTION OF THE DRAWINGS

FIG. 7B is an aggregation of component carriers according to an embodiment of the invention.

DESCRIPTION

Figure 1:
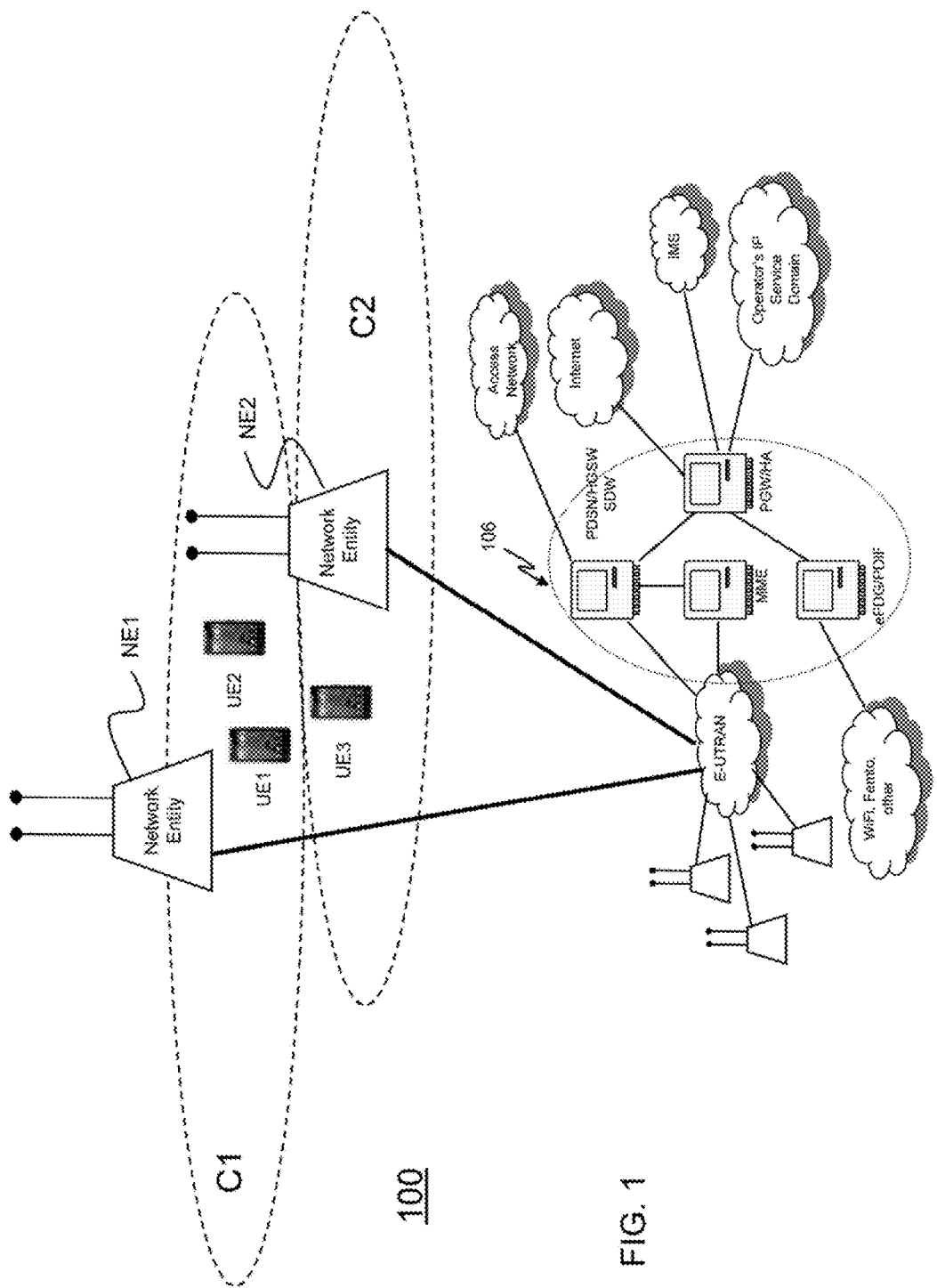
FIG. 1 is an example of a communication system in which various embodiments of the invention may be implemented.

Cellular networks such as LTE and UMTS have traditionally operated on a model in which the network controls radio communications. For example, assume that UE1 and UE2 operate in a traditional cellular network, and that the network includes eNB1 and eNB2, with UE1 being connected to eNB1, and UE2 being connected to eNB2. When UE1 transmits data that is intended for UE2, the data travels from UE1 to eNB1, which relays the data to eNB2. The eNB2 then relays the message to UE2. Thus, it takes at least two hops (UE1->eNB1) (eNB2->UE2) on the cellular network for data to get from UE1 to UE2. There may also be further delay resulting from additional hops being needed for routing. Such delays may occur even if the two UEs are connected to the same eNB.

However, if the UEs are able to communicate directly with one another using so-called Device-to Device (D2D) communication, it would take only one hop (UE1->UE2) for data to get from UE1 to UE2.

In an embodiment of the invention, UEs communicate directly with one another without passing through a network or other intermediate entity. To carry out such D2D communication, the UEs use resources (e.g., cellular spectrum) of the network. The UEs may, however, maintain their usual connections to the network (e.g., each UE may still be connected to an eNB of a cellular network).

Benefits of D2D communication in a cellular network include (1) increased cellular system throughput (e.g., D2D traffic uses fewer resources to communicate same amount of data), and (2) improved user experience (e.g., faster data transfer and reduced latency).

In accordance with the foregoing, a method and apparatus for device-to-device communication is provided. According to an embodiment of the invention, one or both of a first user equipment (UE) and a second UE communicate with a network element (e.g., and eNB) over a carrier (e.g., an uplink or downlink cellular carrier). The first and second UEs also engage in D2D communication using resources of the carrier that have been allocated to them by the network entity. Using the allocated resources, the first and second UEs communicate using a subframe that has a first and a second set of symbols.

The first set of symbols is configured for direct wireless transmission from the first UE to the second UE. The second set of symbols is configured for direct wireless transmission from the second UE to the first UE. Between the first and second sets of symbols is a guard interval. In some embodiments, at least one of the first and second UEs switches from transmitting data to the other UE to receiving data from the other UE during the guard interval. In other embodiments, neither the first nor second UEs transmit to the other during the guard interval.

In some embodiments, the method involves transmitting information regarding a configuration of a subframe to one or both of the UEs via a second carrier (e.g., an uplink carrier or a downlink cellular carrier). The first carrier and the second carrier may be mutually exclusive, in that their respective channel bandwidths do not overlap.

In various embodiments, a need for direct wireless communication between the first UE and the second UE is determined based on one or more factors, including: the location of the first and second UEs relative to one another; the quality of a reference signal transmitted by one or both of the UEs; a user request; the visibility of a small cell identifier to one or more of the first UE and the second UE.

In another embodiment of the invention, a network entity of a wireless communication system sets up a connection with at least a first UE and determines the need for direct wireless communication between the first UE and the second UE. If the network element determines that that there is a need for direct wireless communication between the first UE and the second UE, it assigns a sequence of repeating frames to be used for a direct wireless link between the first UE and the second UE on the carrier. The frames are time-multiplexed within the sequence and each of the repeating frames comprises a plurality subframes, one or more of which have first, second, and third sequences of symbols.

The first sequence of symbols is assigned to the first UE for direct transmission to the second UE. The second sequence of symbols is assigned to the second UE for direct transmission to the first UE. The third sequence of symbols functions as a transition region between the first and second sequence of symbols. The transition region is used by the first or second UE to switch from transmission to reception of wireless signals.

In an embodiment of the invention, the network element determines the capability of a UE to engage in both D2D and cellular communication, and determines a time-multiplexing pattern of the D2D subframes based at least in part on the determined capabilities.

In another embodiment, the network element determines the transmission modes or transmission schemes used by a first UE to transmit on a first sequence of symbols to a second UE. The determination may be made based on the ability of the first UE to engage in direct wireless communication, and the ability of the first UE to engage in cellular communication simultaneously with engaging in direct wireless communication.

Another embodiment of the invention is a first UE that has a transceiver configured to transmit information to a network element on a first carrier, and receive information from a network element on a second carrier. The information identifies resources of the first carrier that have been allocated to the first UE for engaging in direct wireless communication with a second UE. The identified resources include a subframe having a first set of symbols configured for direct wireless transmission from the first UE to the second UE; a second set of symbols configured for direct wireless transmission from the second UE to the first UE; and a guard interval between the first and second sets of symbols.

The UE further includes a memory communicatively linked to the transceiver. The memory is configured to store data representing the identified resources. The UE further includes a processor communicatively linked to the memory and to the transceiver. The processor is configured to retrieve the data from the memory and, using the retrieved data, control the transceiver to engage in direct wireless communication with the second UE using the identified resources of the first carrier.

Referring to FIG. 1, an example of a wireless communication network in which embodiments of the invention may be used will now be described. The network 100 is configured to use one or more Radio Access Technologies (RATs), examples of which include an E-UTRA, IEEE 802.11, and IEEE 802.16. The network 100 includes a first cell C1 and a second cell C2. Possible implementations of C1 and C2 include a cellular network macrocell, a femtocell, a picocell, and a wireless access point. First cell C1 is managed by a first network entity NE1 and second cell C2 is managed by a second network NE2. Possible implementations of a network entity include an E-UTRA base station, an eNB, a transmission point, a Remote Radio Head, an HeNB, an 802.11 AP, and an IEEE 802.16 base station.

Also shown in FIG. 1 are User Equipments (UE) UE1, UE2, and UE3. Possible implementations of a UE include a mobile phone, a tablet computer, a laptop, and an M2M (Machine-to-Machine) device. Each of NE1 and NE2 transmits signals to and receives signals from one or more of the UEs.

Communication between a network entity and a UE typically occurs when the UE is located within the network entity's coverage area. For example, NE1 would typically communicate with UE1 and UE2, and NE2 would typically communicate with UE3. In certain circumstances, each network entity may transmit signals to and receive signals from UEs that are connected to other network entities. For example, NE1 may be able to communicate with UE3 if UE3 is close to NE1's coverage area.

The cells, network entities, and UEs of FIG. 1 are only representative, and are intended to facilitate description. In fact, the network 100 may have many cells and network entities and be in communication with many UEs.

In some embodiments of the invention, C1 or C2 are controlled by a single network entity, or by multiple network entities that coordinate with one another, e.g., when Carrier Aggregation (CA) or Coordinated Multipoint communication (CoMP) is being used. Furthermore, one or more of C1 and C2 may be a virtual cell. A virtual cell is a cell that is created as a result of multiple network entities cooperating. A UE generally does not perceive any distinction between a virtual cell and a non-virtual cell.

In an embodiment of the invention, each UE (FIG. 1) is a wireless communication device capable of sending and receiving data via the network entities NE1 and NE2 to and from other elements of the network 100. Each UE is also capable of communicating with the other UEs over the network 100 via one or more of the network entities NE1 and NE2. Additionally, one or both of the UEs is capable of engaging in D2D communication.

In various embodiments, each UE of FIG. 1 is capable of transmitting user data and control information to one or more of the network entities on an UL carrier, and receiving data and control signals from one or more of the network entities on a DL carrier. As used herein, "control information" includes data that UEs and various elements of the network 100 use for facilitating information, but that is not intended to be accessed by a user or by user applications. "User data" as herein refers to data that is intended to be accessed by a user and user applications.

In an embodiment of the invention, the UL carrier is made up of a first set of RF frequencies, while the DL carrier is made up of a second set of RF frequencies. In some embodiments, the frequencies of the UL carrier do not overlap with the frequencies of the DL carrier. The UL and DL carriers may be part of spectrum licensed for use by a regulatory body, such as the Federal Communication Commission (FCC). The UL and DL carriers may also be assigned for un-licensed use by the regulatory body.

In one embodiment, at least one of the UL carrier and the DL carrier is made up of a single block of contiguous frequencies. In another embodiment, at least one of the UL carrier and the DL carrier is made up of multiple, non-overlapping blocks of contiguous frequencies.

Referring still to FIG. 1, the network 100 also includes a backhaul system (not shown). The backhaul system includes wired and wireless infrastructure elements, such a fiber optic lines, that carry signals around various parts of the network 100, including among the network entities. The network 100 also includes a core 106 that controls the operation of the network 100 using various resources, including billing systems, home location registers, and internet gateways. Several core resources are depicted in FIG. 1. In an LTE implementation, resources of the core 106 communicate with network entities over E-UTRA and with other networks. Examples of core resources are depicted in FIG. 1.

Figure 2:
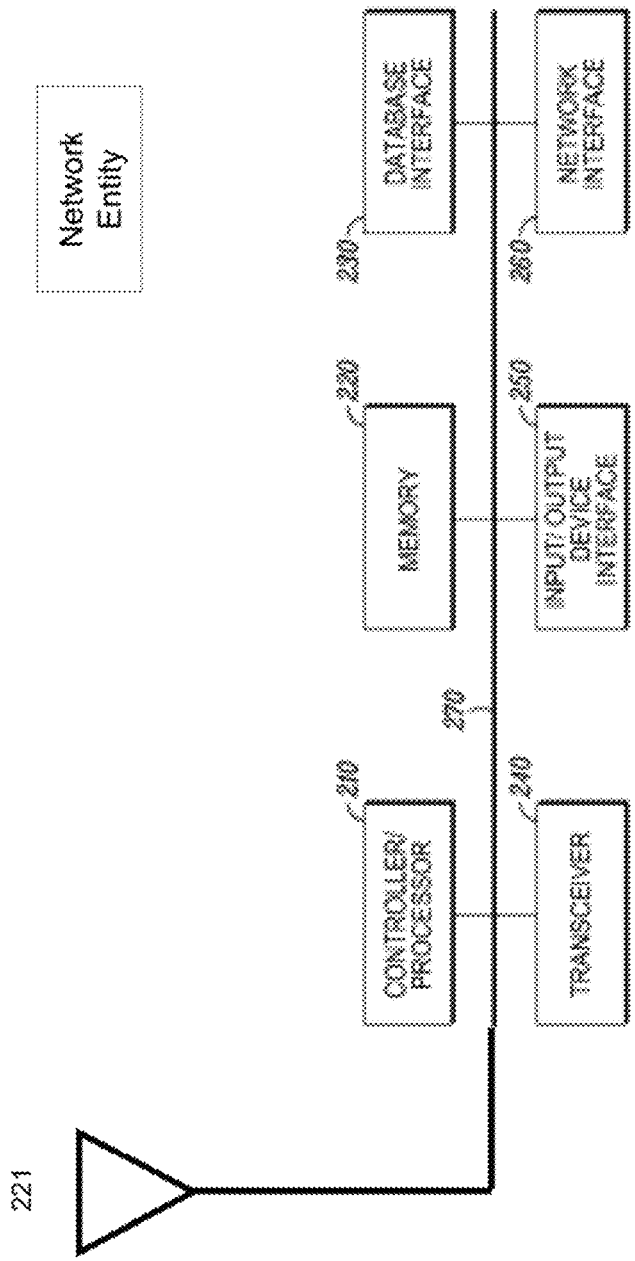
FIG. 2 is a block diagram depicting certain aspects of a network entity in accordance with an embodiment of the invention.

FIG. 2 illustrates a configuration of a network entity (from FIG. 1) in accordance with an embodiment of the invention. The network entity includes a controller/processor 210, a memory 220, a database interface 230, a transceiver 240, input/output (I/O) device interface 250, a network interface 260, and one more antennas, represented by antenna 221.

Each of these elements is communicatively linked to one another via one or more data pathways 270. Examples of data pathways include wires, including wires whose dimensions are measured in microns, and wireless connections.

During operation of the network entity, the transceiver 240 receives data from the controller/processor 210 and transmits RF signals representing the data via the antenna 221. Similarly, the transceiver 240 receives RF signals via the antenna 221 converts the signals into the appropriately formatted data, and provides the data to the controller/processor 210. The controller/processor 210 retrieves instructions from the memory 220 and, based on those instructions, provides outgoing data to, or receives incoming data from the transceiver 240. If needed, the controller/processor can retrieve, from a database via the database interface 230, data that facilitates its operation.

Referring still to FIG. 2, the controller/processor 210 can transmit data to other network entities of the network 100 (FIG. 1) via the network interface 260, which is coupled to the backhaul network. The controller/processor 210 can also receive data from and send data to an external device, such as an external drive, via the input/output interface 250.

The controller/processor 210 may be any programmable processor. The controller/processor 210 may be implemented, for example, as a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like.

The memory 220 may be implemented in a variety of ways, including as volatile and nonvolatile data storage, electrical, magnetic optical memories, random access memory (RAM), cache, hard drive, or other type of memory. Data is stored in the memory 220 or in a separate database. The database interface 230 is used by the controller/processor 210 to access the database. The database contains any formatting data to connect UE to the network 100 (FIG. 1). The transceiver 240 creates a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 100. The network connection interface 260 may be used to connect a client device to the network.

According to an embodiment of the invention, the antenna 221 is one of a set of geographically collocated or proximal physical antenna elements linked to the one or more data paths 270, each having one or more transmitters and one or more receivers. The number of transmitters that the network entity has is related, to the number of transmit antennas that the network entity has. The network entity may use the multiple antennas to support MIMO communication.

Figure 3:
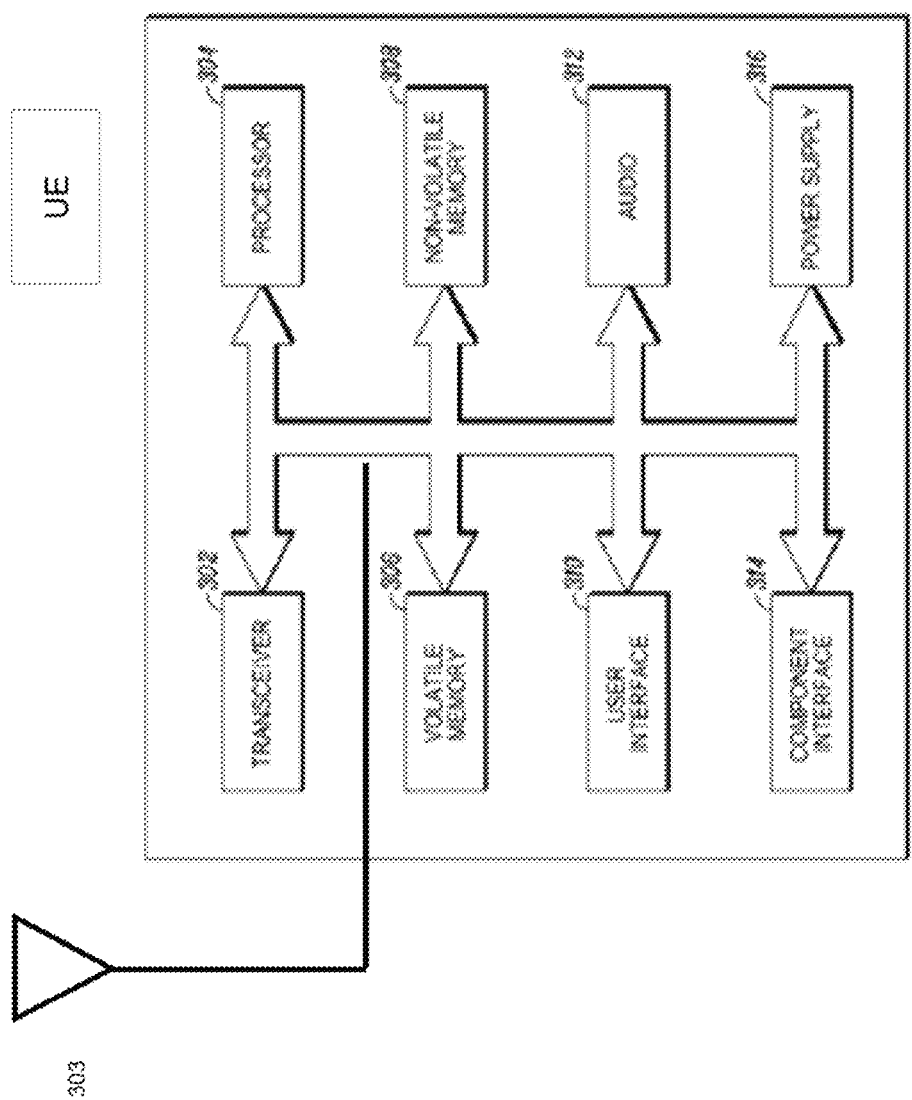
FIG. 3 is a block diagram depicting aspects of a UE in an embodiment of the invention.

FIG. 3 illustrates a block diagram of a UE (such as one or more of the UEs depicted in FIG. 1) according to an embodiment of the invention. The UE includes a transceiver 302, which is capable of sending and receiving data over the network 100. The transceiver is linked to one or more antennas 303 that may be configured like the one or more antennas of the network entity of FIG. 2. The UE may support MIMO.

The UE also includes a processor 304 that executes stored programs, as well as a volatile memory 306, and a non-volatile memory 308. The volatile memory 306 and the non-volatile memory 308 are used by the processor 304. The UE includes a user input interface 310 that may comprise elements such as a keypad, display, touch screen, and the like. The UE also includes a display screen and an audio interface 312 that may comprise elements such as a microphone, earphone, and speaker. The UE also includes a component interface 314 to which additional elements may be attached, for example, a universal serial bus (USB) interface. Finally, the UE includes a power supply 316.

During operation, the transceiver 302 receives data from the processor 304 and transmits RF signals representing the data via the antenna 303. Similarly, the transceiver 302 receives RF signals via the antenna 303, converts the signals into the appropriately formatted data, and provides the data to the processor 304. The processor 304 retrieves instructions from the non-volatile memory 308 and, based on those instructions, provides outgoing data to, or receives incoming data from the transceiver 302. If needed, the processor 304 can write to, or read from the volatile memory 306, particularly for caching data and instructions that the processor 304 requires in order for it to perform its functions.

The user interface 310 includes a display screen, such as a touch-sensitive display, that displays, to the user, the output of various application programs. The user interface 310 additionally includes on-screen buttons that the user can press in order to cause the UE to respond. The content shown on the user interface 310 is generally provided to the user interface at the direction of the processor 304. Similarly, information received through the user interface 310 is provided to the processor, which may then cause the UE to react.

Referring again to FIG. 1, the general mode of communication of the network 100 according to an embodiment of the invention will now be described. The network entities and the UEs generally communicate with one another via physical UL channels of the UL carrier and via physical DL channels of the DL carrier. In an LTE embodiment, the modulation scheme used for communication between the network entities and the UEs differs depending on whether the signals are being sent in the UL direction (travelling from a UE to a network entity) or in the DL direction (travelling from a network entity to a UE). The modulation scheme used in the DL direction is a multiple-access version of OFDM called Orthogonal Frequency-Division Multiple Access (OFDMA). In the UL direction, Single Carrier Frequency Division Multiple Access (SC-FDMA) or DFT-SOFDM is typically used. In an LTE implementation, the bandwidth of the UL or DL carrier varies depending upon whether carrier aggregation is being used (e.g., up to 20 MHz without CA, or up to 100 MHz with CA). In FDD operation, the frequencies in the bandwidth of the UL carrier and the frequencies in the bandwidth of the DL carrier do not overlap.

Figure 4A:
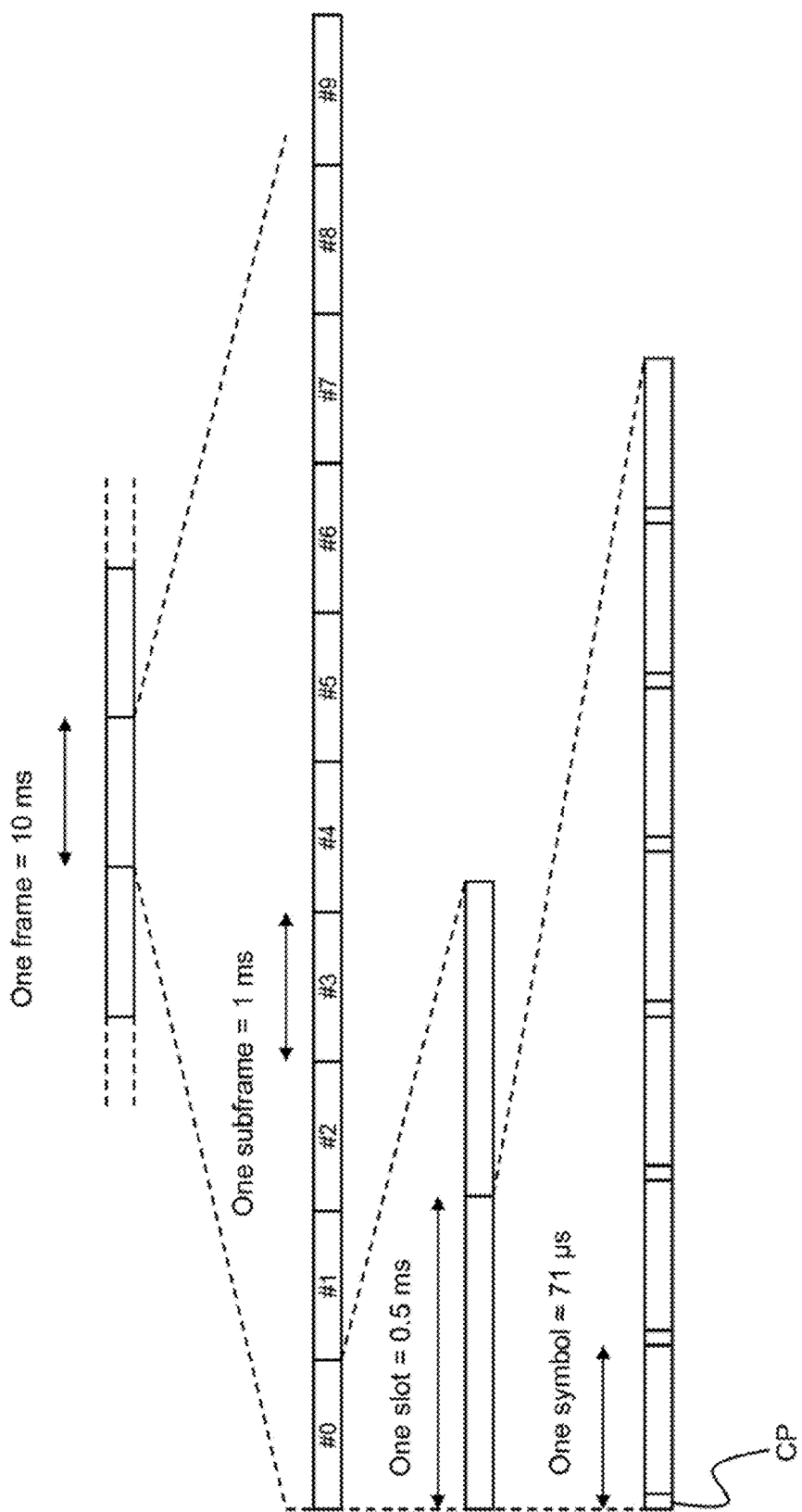
FIG. 4A is a frame structure according to an embodiment of the invention.
Figure 4B:
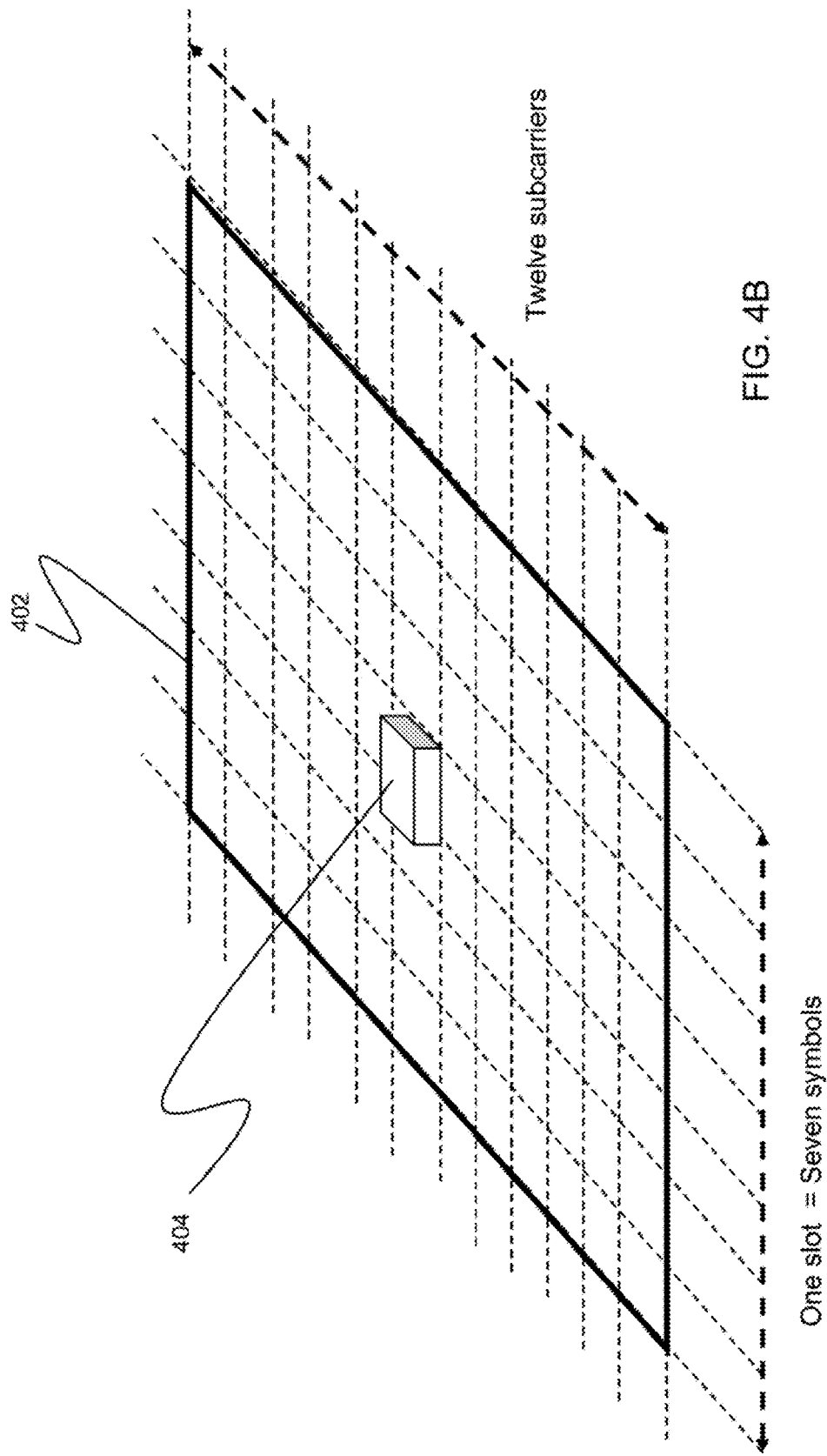
FIG. 4B is a resource block according to an embodiment of the invention.

Referring to FIG. 4A, an LTE frame structure used for carrying data between the UEs and the network entities on both UL carriers and DL carriers according to an embodiment of the invention will now be described. In LTE FDD operation, both uplink and downlink Radio frames are each 10 milliseconds (10 ms) long, and are divided into ten subframes, each of 1 ms duration. Each subframe is divided into two slots of 0.5 ms each. Each slot contains a number of OFDM symbols, and each OFDM symbol may have a Cyclic Prefix (CP). The duration of a CP varies according to the format chosen, but is about 4.7 microseconds in the example of FIG. 4A, with the entire symbol being about 71 microseconds. In the context of time-frequency, the subframe is divided into units of RBs, as shown in FIG. 4B. When a normal CP is used, each RB 402 is 12 subcarriers by 7 symbols (one slot). Each RB (when a normal CP is used), in turn, is composed of 84 REs 404, each of which is 1 subcarrier by 1 symbol. However, RBs and REs may be other sizes in other embodiments. Thus, the terms RE and RB may includes time-frequency resources of any size. In LTE, an RB or an RB pair is the typical unit to which resource allocations may be assigned for uplink and downlink communications.

Figure 5:
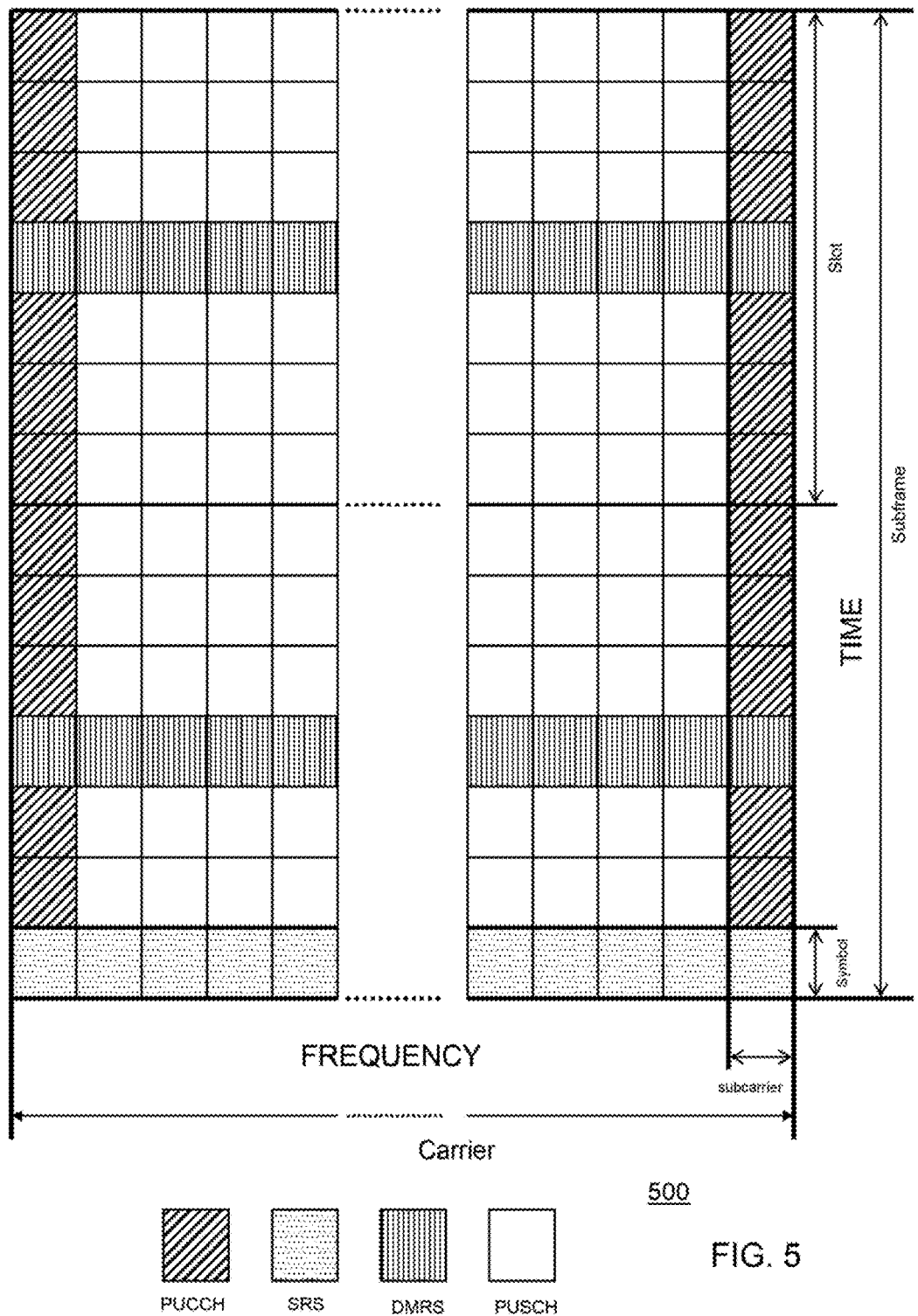
FIG. 5 is an uplink subframe according to an embodiment of the invention.
Figure 6:
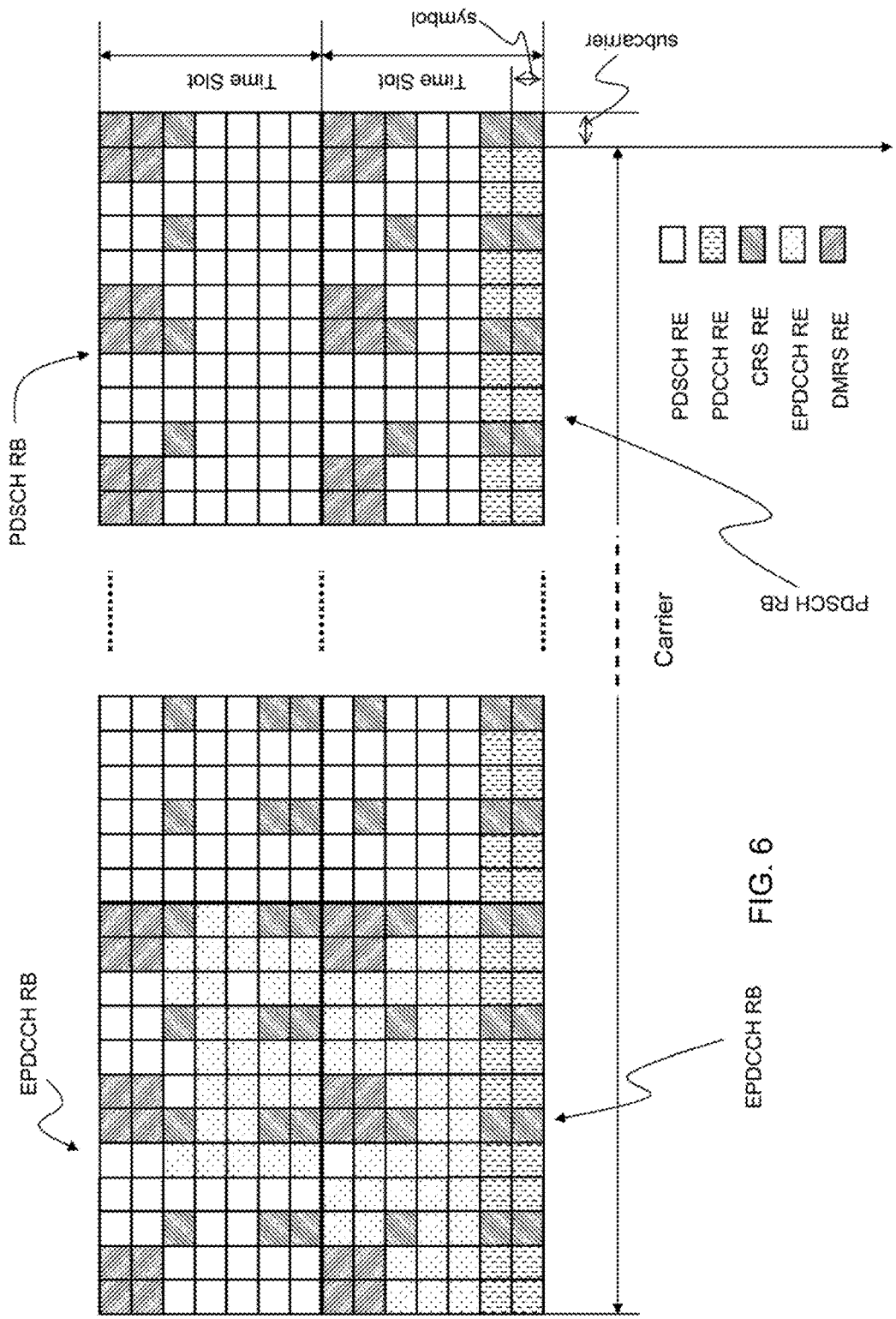
FIG. 6 is a downlink subframe according to an embodiment of the invention.

Referring to FIG. 5, a UL subframe structure used to carry data from UEs to the network entities over an UL carrier according to an LTE embodiment of the invention will now be described. The horizontal scale of FIG. 6 represents frequency, while the vertical scale represents time. In LTE, a UE typically transmits data to a network entity on a Physical Uplink Shared Channel (PUSCH), and typically transmits control information to a network entity on a physical uplink control channel (PUCCH). The PUSCH generally carries user data such as video data (e.g., streaming video) or audio data (e.g., voice calls) from the UEs to the network entities. A UE may also transmit control information on the PUSCH, such as HARQ feedback, CSI reports. Additionally, a UE can transmit a scheduling request (SR) on the PUCCH. A UE may also transmit a sounding reference signal (SRS), which is not part of any particular channel.

To request uplink resources from a network entity in an embodiment of the invention, a UE transmits a scheduling request to a network entity. Referring to FIG. 6, if the network entity grants the request, it responds by sending a scheduling grant to the UE. A scheduling grant is part of the downlink control information (DCI). The network entity transmits the DCI on a downlink control channel (e.g., a physical downlink control channel (PDCCH)). The scheduling grant provides the UE with parameters that the UE uses to transmit data on the PUSCH. These parameters include a data modulation and coding scheme, the transport block size, a resource allocation (e.g., resource blocks and position within the transmission bandwidth configuration), hopping parameters, power control information, and other control information.

In an embodiment of the invention, there are different PUCCH formats, but regardless of format a PUCCH generally carries control information from the UEs to the network entities. PUCCH resource blocks are typically located at the edges of the UL carrier, while the RBs in between may be used for PUSCH resource assignment. In various embodiments of the invention described herein, a network entity can configure a PUCCH to carry data from UE to UE in D2D communication. The portion of the PUCCH used for D2D will be referred to as PUCCH-D2D.

The control information transmitted by a UE on the PUCCH includes HARQ feedback, SR, and CSI reports. The UE sends HARQ feedback in order to ACK or NACK data that the UE receives from a network entity. An SR is used by the UE to request UL resources from the network entity 100, including from one or more network entities. CSI reports are used by a UE to report, to a network entity, information regarding the DL transmission channel as seen from the point of view of the UE.

Each CSI report sent by a UE may include one or more of a CQI, a PMI, PTI, and an RI. The UE uses the CQI to indicate the highest MCS that, if used, would result in DL transmissions having a BLER of no more than 10%. The UE uses the PMI to indicate, to the network entity, which precoder matrix should be used for DL transmissions. The RI is used by the UE to recommend the transmission rank (number of transmission layers) that should preferably be used for DL transmission to the UE. The PTI distinguishes slow fading environments from fast fading environments.

According to an embodiment of the invention, the UE transmits control information on RB pairs configured for PUCCH-D2D. The PUCCH-D2D RBs do not have to be contiguous. Each RB of a pair may, for example, be located on opposite ends of the frequency range of the transmission bandwidth.

A UE may transmit an UL DM-RS and/or SRS during communication with the network. The UL DM-RS is used by a network entity for channel estimation to enable coherent demodulation of the PUSCH and/or PUCCH. The SRS is used by the network entity for channel state estimation to support uplink channel-dependent scheduling and link adaptation.

Referring to FIG. 6, a time-frequency diagram of a DL subframe used for carrying data from one or more network entities to a UE on a DL carrier will now be described. The horizontal scale of FIG. 6 represents frequency, while the vertical scale represents time. The horizontal scale is divided into multiple blocks of frequency, or OFDM subcarriers ("subcarriers") that may be allocated for transmission. The vertical scale of FIG. 6 is divided into multiple blocks of time, or OFDM symbols ("symbols") that may be allocated for transmission. The subframe is divided into time-frequency resource blocks (RBs). Each RB is twelve subcarriers by seven symbols typically for normal CP. The subframe is a total of 1 ms long and is divided into two time slots of 0.5 ms each. In turn, each RB can be divided into multiple resource elements (REs). Each RE is one subcarrier by one symbol.

The DL subframe includes several types of reference signals. The references signals are transmitted by the network entity to the UE to enable the UE to perform various functions. One such reference signal is Channel State Information Reference Signal (CSI-RS), which is used by the UE to determine channel-state information (CSI). The UE reports CSI to the network entity. The CSI-RS is not necessarily transmitted in all subframes.

Referring again to FIG. 6, other reference signals on the UL subframe include a Demodulation Reference Signal (DM-RS) with the REs being referred to as DM-RS REs. Typically, reference signals corresponding to antenna ports 7 and 8 are multiplexed using Code Division Multiplexing (CDM) or other scheme and are mapped to the same REs in time and frequency domain. The subframe can also include other reference signals such as cell-specific reference signal (CRS), positioning reference signal (PRS), primary synchronization signal (PSS) and secondary synchronization signal (SSS) that are distributed in the control regions and/or user data regions of the sub-frame.

The network entity provides the CSI-RS configuration to the UE via RRC signaling. The RRC layer in the UE provides the CSI-RS configuration information to the physical layer in the UE (e.g., "higher layer signaling").

Figure 7A:
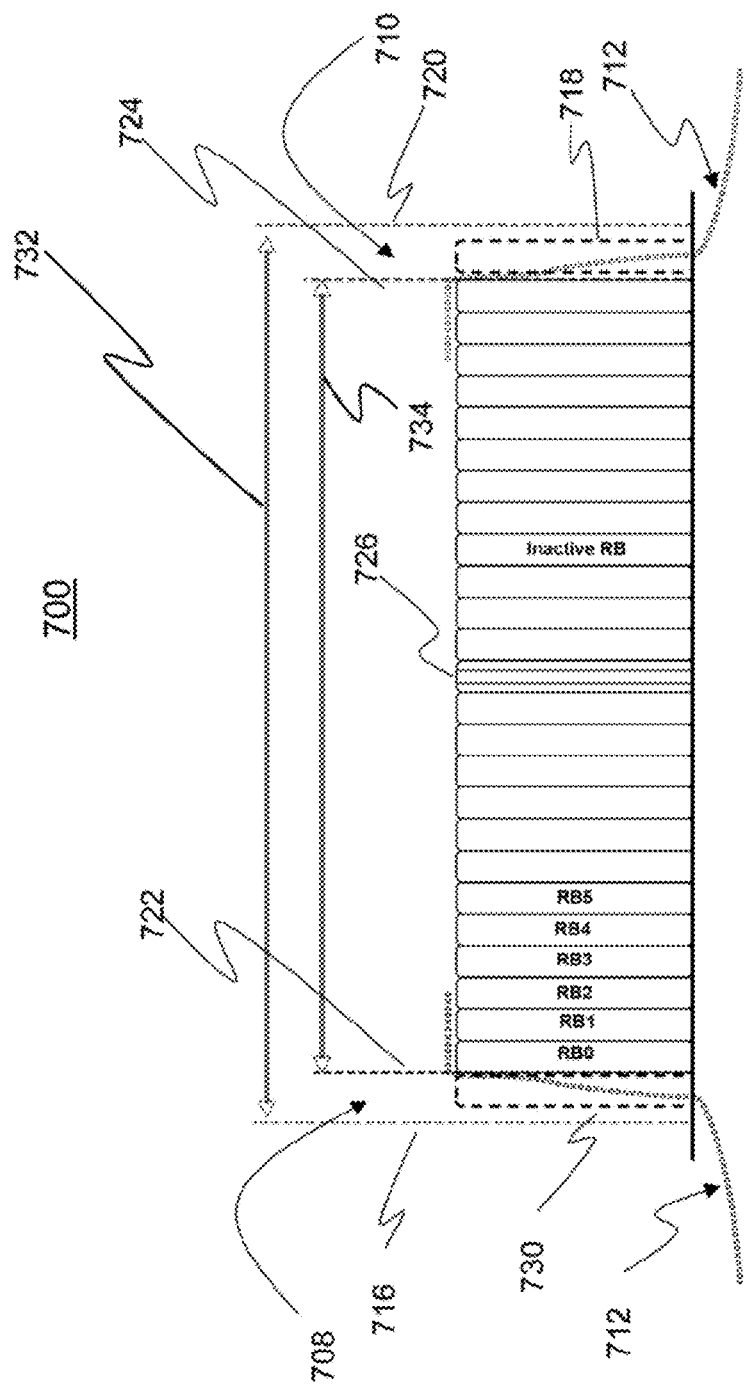
FIG. 7A is a carrier according to an embodiment of the invention.

Referring to FIG. 7A, the structure of an uplink carrier will now be described. The UL carrier 700 has a channel bandwidth 732 that spans a range of frequencies from a first edge 716 to a second edge 720. The carrier 700 also has a range of frequencies that make up a transmission bandwidth configuration 734. The transmission bandwidth configuration starts at a first edge 722 and ends at a second edge 724. Between the first edge 716 of the channel bandwidth and the first edge 722 of the transmission bandwidth configuration is a first spectral emissions region 708. Between the second edge 720 of the channel bandwidth and the second edge 724 of the transmission bandwidth configuration is a second spectral emissions region 710.

Referring still to FIG. 7A the channel bandwidth 732 is the RF bandwidth supporting a single RF carrier with the transmission bandwidth configured in the uplink or downlink of a cell. The channel bandwidth is typically measured in MHz and is usually used as a reference for transmitter and receiver RF requirements. The transmission bandwidth configuration 734 is the highest transmission bandwidth permitted (e.g., according to industry standards, or government regulation) for uplink or downlink in a given channel bandwidth. In some cases (e.g., when the carrier is an E-UTRA/LTE carrier), transmission bandwidth configuration is measured in Resource Block units.

Referring to FIG. 7B, an aggregated carrier 750 is shown. The carrier 750 has an aggregated channel bandwidth 780 and an aggregated transmission bandwidth configuration 782. The aggregated carrier 750 is made up of three component carriers 752, 754, and 756. As shown in FIG. 7B, the same elements described in conjunction with FIG. 7A are present in the carrier 750. Specifically, there are RBs 760 defined in the spectral emission regions outside of the transmission bandwidth configuration of each of the three component carriers but within the channel bandwidths of each of the three carriers.

Referring still to FIG. 7B, the aggregated channel bandwidth 780 is the RF bandwidth in which a UE can transmit and/or receive multiple contiguously aggregated carriers. The aggregated transmission bandwidth configuration 782 is the highest transmission bandwidth permitted (e.g., according to industry standards, or government regulation) for uplink or downlink in a given aggregated channel bandwidth. In some cases (e.g., when the carrier is an E-UTRA/LTE carrier), transmission bandwidth configuration is measured in Resource Block units.

Using HARQ

Figure 14:
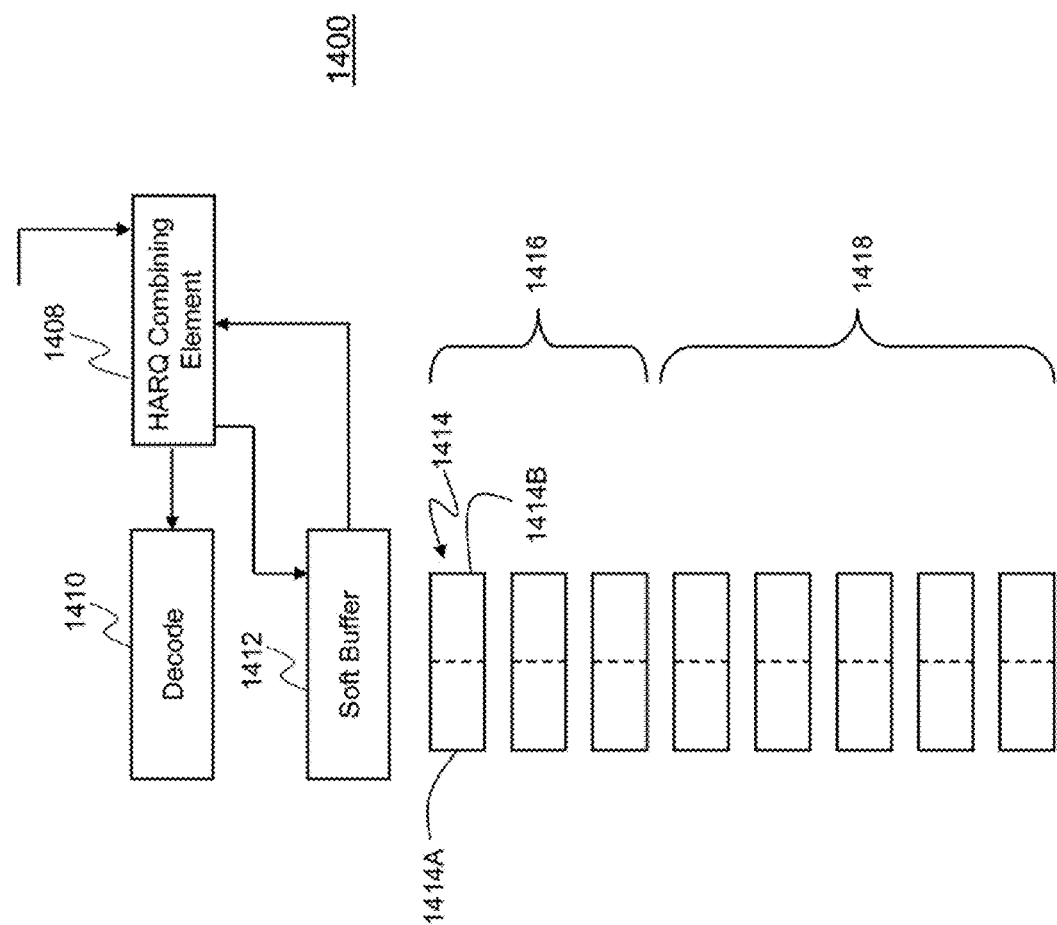
FIG. 14 depicts HARQ buffering according to an embodiment of the invention.

The structure of a soft buffer in the manner in which UEs use the soft buffer in an embodiment of the invention will now be described with reference to FIGS. 3 and 14. Referring to FIG. 3, the transceiver 302 receives the signal via a carrier (e.g., a UL carrier, a DL carrier, or a D2D carrier). The transceiver 302 passes the signal to the processor 304 which, in this example, is a baseband processor. One or more of the transceiver 302 and processor 304 includes a signal processing element 1400, which is shown in FIG. 14.

The signal processing element 1400 may be implemented in hardware, software, or a combination of the two. The signal processing element 1400 is organized into functional blocks. These blocks are depicted in FIG. 14, and their functions will now be described. The signal is received by the transceiver 302 (FIG. 3), which demodulates the signal and generates the received Log-likelihood ratios (LLRs) for a given TB. The HARQ combining element 1408 combines the received LLRs with stored LLRs for the TB from a previous transmission. The combined LLRs are decoded by the processor 304 at block 1410 and may be passed to another process (e.g., sent to higher layers for further processing). If the TB is not successfully decoded, then the combined LLRs for that TB are stored in a partition 314 of a soft buffer 1412.

If a TB is not successfully decoded at block 1410, the UE may transmit the HARQ feedback on its uplink. The soft buffer 1412 holds the combined LLR for a TB until the UE makes another attempt to decode the TB.

The transmitting entity (not shown in FIG. 14), upon receiving the HARQ feedback indicating the UE has not successfully received the TB, attempts to retransmit the TB. The retransmitted TB is put through the same functional blocks as before, but when the UE attempts to decode the retransmitted TB at block 1410, the UE retrieves the LLRs for the TB from its memory 1414, and uses the HARQ combining element 1408 to combine the received LLRs and the stored LLRs for the TB in a process known as "soft combining." The combined LLRs are provided to the decoder 1410, which decodes the TB and provides the successfully decoded TB to higher layers for further processing.

The soft buffer 1412 may also be referred to as a HARQ memory or HARQ buffer. Since there are multiple HARQ processes, a HARQ process index or HARQ identity (typically signaled using an explicit field within DCI format associated with the TB (e.g. for downlink), or implicitly determined via subframe number, system frame number, etc (e.g. for uplink)) is made available for the HARQ combining element 1418 to correctly perform the combining operation. For the uplink transmission, the implicit HARQ process index is used by the UE 1418 to correctly determine the coded bits for uplink transmissions.

If UE is configured with a transmission mode with a maximum of one TB per HARQ process (or one TB per TTI), the soft buffer of the UE may be divided into eight partitions 1414 as shown in FIG. 14. If the UE is configured with transmissions modes with a maximum of two TBs per HARQ process (or two TBs per TTI), each of the eight partitions 1414 may be further divided into a first partition 1414A and a second partition 1414B, or the soft buffer of the UE may be divided into sixteen partitions.

In an LTE embodiment of the invention, a UE's soft buffer configuration is determined at least in part by its category. Referring to Table 1, for example, a UE of Category-3 is expected to offer 1,237,248 soft channel locations, wherein each soft channel location can store a Log-likelihood ratio (LLR).

For FDD, for a given component carrier, a UE has eight HARQ processes in DL. Based on the transmission mode, the UE is capable of receiving one or two transport blocks (corresponding to a HARQ process) within a TTI. Thus, a UE may determine the amount of storage per received transport block based on the total number of soft channel bits, the maximum number of HARQ processes, the transmission mode, etc. Similarly, NE1 may encode and transmit only those coded bits that it knows the UE is capable of processing and/or storing.

In some scenarios, if the UE has insufficient amount of storage for a given transport block, and a decoding failure occurs, the UE may choose to store some LLRs and discard some other LLRs. In other scenarios, if no storage is available or no storage is deemed necessary for a transport block, if a decoding failure occurs, the UE may discard all LLRs corresponding to the transport block. Such scenarios typically occur where the network entity transmits a quantity of coded bits that exceed the storage capacity of the UE. Typical examples include: (1) when carrier aggregation is being used (e.g., a UE is supporting two or more carriers, and 8 HARQ processes per carrier), and (2) When TDD is being used (e.g., UE supporting up to 15 HARQ processes per carrier). For FDD, and for uplink, for a given component carrier, a UE has eight HARQ processes when the UE is not configured in UL-MIMO transmission mode (16 when the UE is configured in UL-MIMO transmission mode). For TDD, the number of HARQ processes for the uplink is determined based on the TDD UL/DL configuration.

With reference to Table 1, the soft buffer dimensioning for UE Category 3 in LTE Rel-8/9 is defined assuming Limited Buffer Rate Matching (LBRM). With LBRM, for a subset of large TB sizes, the UE is allowed to provision a per TB soft buffer size that is smaller than the maximum required soft buffer size to achieve mother code rate of 1/3. For example, a standard-compliant LTE Category 3 UE operating with 2 spatial layers should support a largest TB size of 75376. For this TB size, given 1237248 total soft channel bits (i.e., soft buffer size corresponding to these bits), the UE can only provision 77328 soft channel bits per each of the two possible TBs within a TTI. This amounts to an effective mother code rate (ECR) or minimum achievable code rate of around 0.97 for that TB size. The effective mother code rate may be defined as the number of information bits divided by the number of encoded bits that can be stored in the soft buffer It is to be noted that the effective mother code rate may be different from the code rate employed by the FEC encoder (e.g. turbo code), as the two are defined from different perspectives. It is possible to have a turbo code (FEC encoder) code rate of 1/3, wherein the code is shortened or some of the output parity bits are punctured (due to soft buffer storage limitations) to lead to an effective mother code rate larger than 1/3. For example, if 50% of the output parity bits are punctured, then the ECR is approximately 2/3 whereas the turbo code rate is 1/3. For TB sizes less than 25456 approximately, the ECR is the same as mother code rate of 1/3, which means that LBRM need not be employed.

In an LTE embodiment of the invention, the number of soft channel bits for encoding a TB is determined as follows:

$$N_{IR} = \left\lfloor \frac{N_{soft}}{K_C \cdot K_{MIMO} \cdot \min(M_{DL\_HARQ}, M_{limit})} \right\rfloor$$

where $N_{soft}$ is the total number of soft channel bits, $K_{MIMO}$ is equal to 2 if the UE is configured to receive PDSCH transmissions based on spatial multiplexing with rank greater than 1 such as transmission modes 3, 4 or 8, 1 otherwise, $M_{DL\_HARQ}$ is the maximum number of DL HARQ processes (i.e., HARQ processes in the downlink direction), and $M_{limit}$ is a constant equal to 8, $K_C$ is a value (from 1, 2 or 5) dependent on the UE category and UE capability with regard to support of a number of spatial layers for the component carrier on which the transport block is transmitted. If a UE signals a Rel-10 UE category (one of 6, 7, 8) it also signals a corresponding second category (one of 4, 5) for backward-compatibility (e.g. to allow a Rel-10 Category6 UE operate in a Rel-8/9 network). The value of $N_{soft}$ used for encoding a TB is based on the signaled UE category, maximum number of layers supported by the UE on the particular component carrier, etc. On the UE side, the number of soft channel bits that UE offers for storing a TB on a carrier may be given by the same formula above, but replacing $N_{soft}$ with $N_{soft}/N_{cell}$, where $N_{cell}$ is the number of configured component carriers for the UE.

When the UE transmits a transport block on the uplink to a network entity, LBRM is typically not applied because the network entity has adequate memory resources. Therefore, for uplink transmission, the number of encoded bits for a transport block is given by the turbo code mother code rate with the LBRM being transparent. This implies that the rate-matching procedure on the downlink direction (with LBRM) and the same in uplink direction (i.e. w/o LBRM) is not symmetric.

D2D Communication

In an embodiment of the invention, UEs engage in D2D communication using resources of either the UL or the DL carriers. The UEs may also engage in D2D communication using resources of other carriers that are not used by the UEs to communicate with the network entities.

The UEs may, in an embodiment of the invention, engage in D2D communication with one another on a frame structure that uses time-frequency resources of either the UL carrier or the DL carrier. In some embodiments the structure of the frame is based on a TDD frame. the D2D frames/subframes can be completely distinct from the frames/subframes that are used for communication between the network elements and the UEs.

In various embodiments of the invention, UEs transmit data to one another over channels defined similar to PUSCH when the UEs are engaged in D2D communication, such as D2D-SCH (D2D-Shared Channel) or PUCCH-D2D. The PUCCH-D2D may be seen as another instantiation of a configured D2D-shared channel.

The RBs of an RB pair assigned for a D2D link may be next to one another in the subframe or may be separated in frequency. In some cases, when the UEs are engaged in D2D communication, the UEs transmit data to one another over a separate physical channel that is defined specifically for D2D communication (e.g., D2D-SCH).

The RBs of an RB pair assigned for a D2D-SCH may be next to one another in the subframe or may be separated in frequency. The RBs of an RB pair assigned for a D2D-SCH may be next to RBs of an RB-pair assigned for PUSCH. RBs assigned for PUSCH and RBs assigned for D2D-SCH may share the same UL carrier. D2D links carrying user data and control information between UEs can occur over D2D-SCH or similarly defined links. The configuration for the D2D links may be similar to PUSCH, PDSCH or PUCCH. The PDSCH may be appropriate since one UE is transmitting to another, similar to the network transmitting to a UE in regular cellular communications.

Determining Whether D2D Communication is to be Used

In accordance with an embodiment of the invention, UEs enter D2D mode based on a decision making process. This decision making process may be carried out by one or more of the UEs, and/or by a network entity. A UE or network entity can make this determination when the UE is in idle mode, in which the UE is generally not communicating with the network 100, except for sending or receiving location information, paging signals, and emergency signals. The UE or network entity can also make this determination when the UE is in a connected mode, in which the network 100 has obtained information about the specific UE, and maintains that information.

Once it has been decided that the UEs are to start communicating with one another in D2D mode, either one or more of the UEs requests permission to begin D2D communication from the network entity, or the network entity orders, without receiving a request, one or more of the UEs to enter D2D mode. In an embodiment of the invention, the decision is made by, at least in part, by the core 106. It is to be understood, however, that the decision of whether or not the UEs can enter D2D communication (e.g., a command to do so) is communicated to the UEs from the network entity, even if the resources of the core 106 take part in the decision making.

According to an embodiment of the invention, the determination as to whether or not UEs should communicate using D2D is made based on one or more of a variety of factors, including the proximity of the UEs to one another, the strength of reference signals that one of the UEs receives from the other UE, the strength of the signals that the network entity receives from one or more of the UEs, the detection of a user input.

In one embodiment, the UE or network entity makes the D2D determination based on the strength of a public safety network signal (e.g., a public safety UE reference signal) that a UE and/or network entity detects. As a result of the detected strength, it may be decided that the UEs will reduce their maximum transmit power, or that they will refrain from D2D communication entirely. For example, if the public safety network signal is weak, then the UEs or network entity may decide to refrain from D2D communication. If the public safety network signal is strong, then the UEs or network entity may decide to proceed with D2D communication. However, in an emergency (e.g., a UE dials 911) a UE may be permitted to transmit critical information, such as its location, in D2D mode. In such a case, the UE would be able to use a limited, designated set of resources (subframes and/or resource blocks) to communicate.

In an embodiment of the invention, a network entity determines whether to set up a D2D connection between UEs based on the ability of each UE to engage in D2D communication, and based on the ability of each UE to engage simultaneously in both D2D and regular cellular communication. The network entity may, prior to making this determination, establish a connection with one or more of the UEs. In such case, the D2D communication may occur on the same carrier that the network entity used for connecting to the UEs.

Referring to FIG. 1, the network entities and the UEs may request and receive information from the core 106 to assist in making the D2D determination. A network entity can determine the proximity between the UEs by requesting location information from the core (which may maintain a record of the location of the UEs and/or subscription information) or using GPS location reports from the UEs. The network entity can determine the strength of signals that, for example, UE2 receives from UE1 by obtaining a report from UE2 describing the strength of reference signals transmitted by UE1. The UEs can also determine their proximity to one another using the DM-RS configuration of the other UE sent out by network entity. The DM-RS serve as reference signals that are used by the UE in conjunction with a threshold to determine their proximity to one another.

In some circumstances, UEs may be operating in different cells, yet be close enough and have a strong enough signal between them to communicate D2D. For example, in FIG. 1, UE2 and UE3 may be able to communicate using D2D even though UE1 is in C1 and UE3 is in C2. In such a case, the network entity of C1 may need to communicate with the network entity of C2 via the backhaul network to coordinate the set of up such D2D communication.

Reference Signals for Discovery

According to an embodiment of the invention, UEs having D2D capability can transmit reference signals to allow other D2D-capable UEs to discover them. There are many types of signals that a UE can use as a reference signal for the purpose of D2D discovery. In an embodiment of the invention, a UE implements a D2D discovery reference signal by transmitting a zero power PUSCH or PDSCH, in which only the embedded DM-RS has a non-zero power level. Alternatively, the UE uses SRS, SR, HARQ feedback information as reference signals. Alternatively, the UE may transmit a beacon signal specifically defined for D2D discovery. The beacon signal specifically defined for D2D discovery may be mapped to the same RE locations in time-frequency that the UE would have used for transmitting UL DM-RS or SRS to the network entity.

The reference signal may also include substantive data. For example, a UE can use an SR or HARQ feedback information as a reference signal. An SR and HARQ feedback each have a one-bit field, which the UE can use to indicate information about itself, such as its receiver type capabilities, power control information, mobility information (e.g., is the device stationary), or information about its preferred/desired D2D operating mode to be used for communication.

In one embodiment of the invention, the network entity over-provisions an existing channel in order to provide resource blocks for use by the UEs to transmit a reference signal. In this embodiment, a UE transmits a reference signal on resource blocks that are on or near the edge of the transmission bandwidth configuration of a carrier. The transmission bandwidth configuration contains resources blocks that the network entity has configured for use for typical UE to network communication. Not all of the resource blocks within the transmission bandwidth configuration are necessarily used during a given time. Examples are shown in FIGS. 7A and 7B.

In another embodiment of the invention, the network entity defines additional resource blocks on which UEs can transmit a reference signal. These additionally-defined resource blocks are within the channel bandwidth of the carrier, but are outside of the transmission bandwidth configuration. These resource blocks are on frequencies near the boundary of the spectral emissions mask. In some cases, transmissions on these frequencies are of lower energy than those frequencies that are within the channel bandwidth. Examples are shown in FIGS. 7A and 7B.

There are many ways that the UEs may use a reference signal to determine whether D2D communication is feasible. In one embodiment, a UE varies the power level of the reference signal using a ramping scheme. For example, referring to FIG. 8A, UE1 transmits a reference signal. UE1 varies increases the energy of the reference signal over successive, adjacent symbols/subframes. UE2 receives the reference signal, and measures the energy per symbol or per subframe of the reference signal. UE2 then determines whether the energy it detects in the reference signal reaches at least a predetermined level (e.g., predetermined according to a communication standard used by UE1 and UE2). UE2 then makes the D2D feasibility determination based on the reference signal energy detected. If the reference signal energy detected by UE2 does not reach the predetermined level, then UE2 does not initiate D2D communication. If the detected energy level does reach the threshold, UE2 initiates D2D communication. Alternatively, UE2 reports, to the network entity, the highest reference signal power level that UE2 can receive, and the network entity determines whether D2D communication should occur, and orders one or both of the UEs to engage in D2D communication.

In another embodiment, reference signals may be transmitted at a predetermined power level. The predetermined power level may be lower than the maximum power level allowed for D2D. The predetermined power level may be a power level known to all UEs in a cell and may be determined based on a signal received from a network entity associated with the cell. For example, the network entity broadcasts the allowed reference signal power level for D2D communication for all UEs served in that cell. This effectively allows the network entity to control the range of D2D communication between UEs attached to that serving cell.

In another embodiment, UEs in a serving cell communicating with the network entity using a particular RAT, can report measurements or other information relevant to another RAT to the network entity, and the network entity can use this information determine the proximity of the UEs. For example, the UEs may report the service set identifiers (SSIDs) or other Medium Access Control IDs (MAC IDs) of the wireless access points that are 'visible' to them (for example signal strength or other related measurement such as RSRP or RSRQ or RSSI exceeds a threshold) to the network entity, and if the base station determines that two UEs can see the same access point (i.e., two UEs report same SSID or MAC ID), it can then configure the devices to turn on their D2D reference signals. More generally, UEs may report the small cell identifiers of the small cells that are 'visible' to them to the network entity, and if the base station determines that two UEs can see the same small cell, it can then configure the devices to turn on their D2D reference signals.

Frame/Subframe Format

Figure 8A:
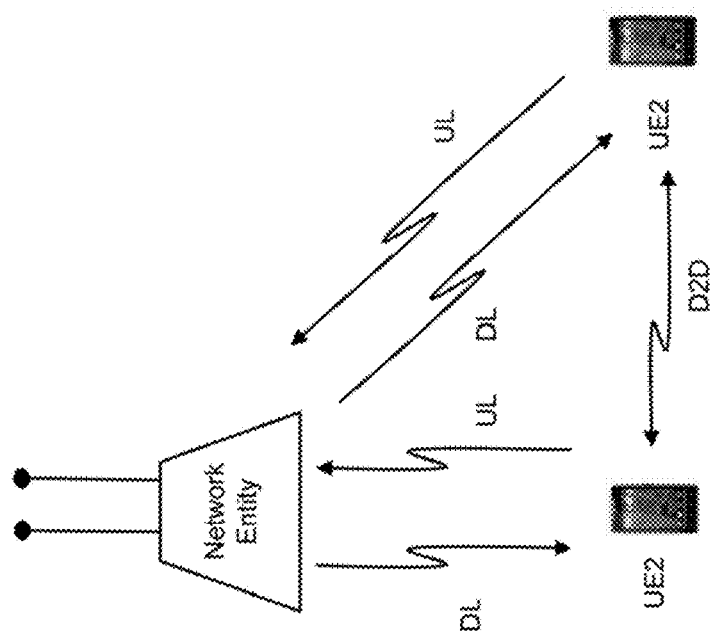
FIG. 8A is a wireless network according to an embodiment of the invention.
Figure 8B:
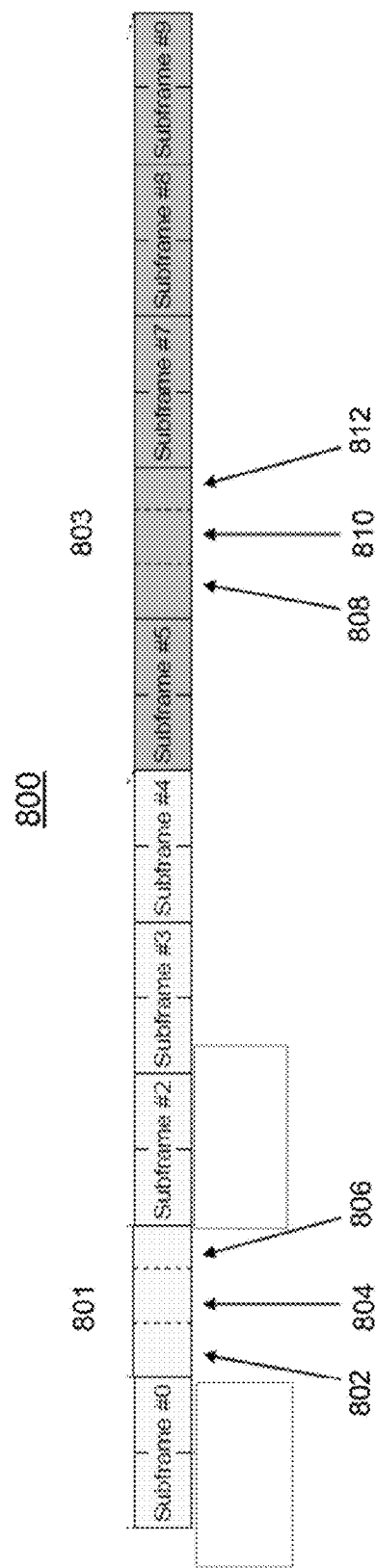
FIG. 8B shows a frame, subframe, and special subframe according to an embodiment of the invention.

According to an embodiment of the invention, UE1 and UE2 communicate with one another using the frame format shown in FIG. 8B. The subframes are time-multiplexed, with UE1 and UE2 transmitting on different subframes. An exception is during a special subframe, during which a first set of symbols of the subframe is reserved for UE1 to transmit; a second set of symbols is a guard interval during which neither UE transmits to the other; and a third set of symbols is reserved for the other UE to transmit. In some embodiments, one or more of the subframes are reserved for use by one or more of the UEs to listen for downlink data from a network entity.

In an embodiment of the invention, the UE1 and UE2 (FIG. 1) communicate with one another using the general frame structure of FIG. 8B. As shown, the frame 800 includes regular subframes #0, #2, #3, #4, #5, #7, #8, and #9. Each of the regular subframes will be used for D2D, or for communicating with the network entity. Subframes #1 and #6, which are labeled with reference numbers 801 and 803, are special subframes. A special subframe provides a transition, in which a UE1 (but not UE2) transmits during a first set of symbols 802, the second set of symbols 804 are used as a guard interval, in which neither the UE1 nor UE2 transmits using those resources, and a third set of symbols 806, in which UE2 (but not UE1) transmits.

In an embodiment of the invention, the UEs can switch their order of transmission in another special subframe 803, in which UE2 (but not the UE1) transmits during a first set of symbols 808, the second set of symbols 810 are used as a guard interval, in which neither the UE1 nor UE2 transmits using those resources, and a third set of symbols 812, in which UE1 (but not UE2) transmits. This scheme will be described in more detail with the examples that follow. The placement of the special subframes in FIG. 8B is meant for illustration purposes only, and the examples below may have them placed differently.

Figure 9:
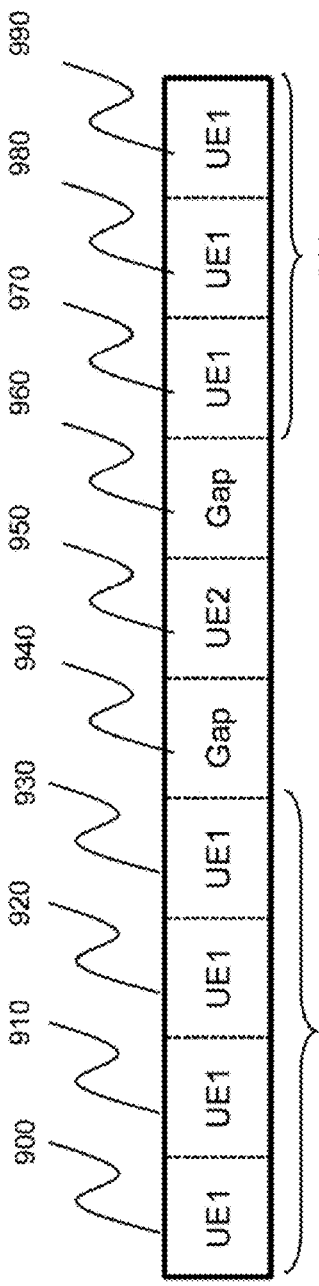
FIGS. 9, 10, and 11 show a D2D communication scheme according to an embodiment of the invention.
Figure 10:
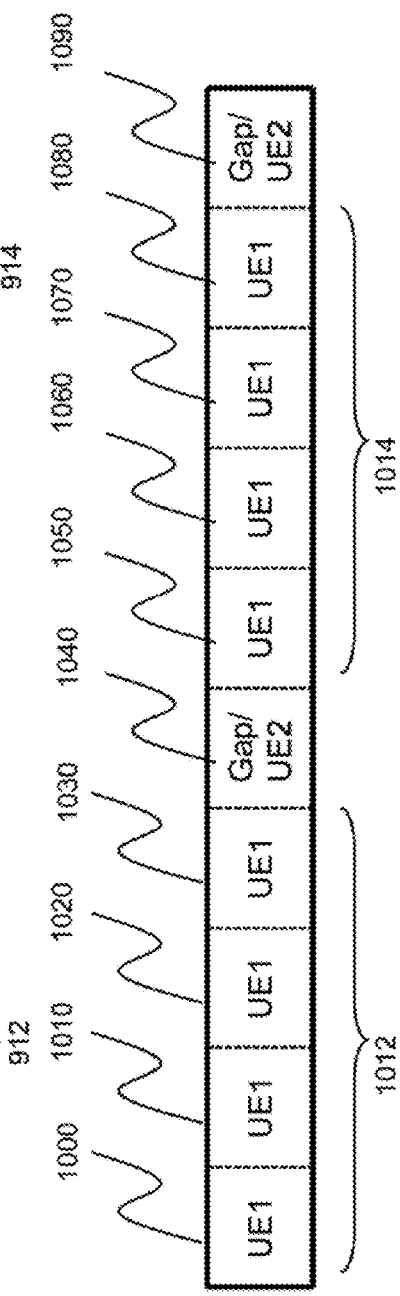
Figure 11:
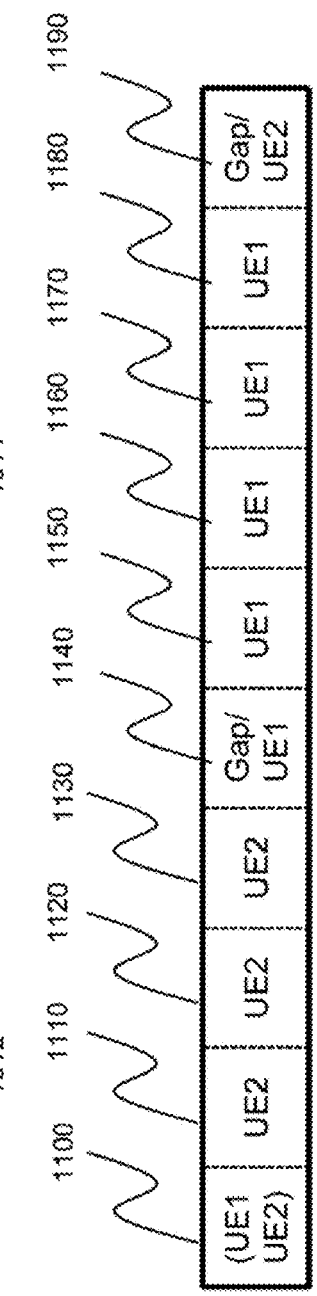

Reference will now be made to FIGS. 9, 10, and 11 in order to describe how D2D communication occurs in different embodiments of the invention. It to be understood that special subframes may be implemented using the structure of the special subframes 801 and 803 of FIG. 8B. It is also to be understood that some embodiments, the entire special subframe is a guard interval, while in other embodiments, the guard interval lasts for only a single symbol.

Referring to FIG. 9, it will be assumed that UE1 is sending a file to UE2, and UE1 has been allocated three subframes for every one subframe allocated to UE 1. Further, it will be assumed that the data being transferred is organized into blocks of data, such as transport blocks, packets, bursts, or the like. In subframes 900, 910, 920, and 930, UE1 transmits the first block 912 to UE2. UE1 and UE2 switch transmitter and receiver roles during the special subframe of slot 940. In subframe 950, UE2 transmits to UE1 (e.g. data and/or control information, such as an ACK). Again, UE1 and UE2 switch roles during special subframe 960. UE1 transmits a second block 914 to UE2 during subframes 970, 980, and 990.

Referring to FIG. 10, another embodiment is shown. In this embodiment, UE1 and UE2 communicate on time-duplexed slots. In slots 1000, 1010, 1020, and 1030, UE1 transmits block 1012 to UE2. In slot 1040, there is a special subframe, configured as the subframes 801 and 803 shown in FIG. 8B. UE1 and UE2 switch transmitter and receiver roles during the special subframe of slot 1040. UE1 then transmits a second block 1014 to UE2 during slots 1050, 1060, 1010, and 1080. In a slot 1090, which includes a special subframe, UE1 and UE2 switch roles, with UE2 becoming the transmitter, and UE1 becoming the receiver.

Referring to FIG. 11, another embodiment is shown. In this embodiment, a subframe is set aside to allow UE1 and UE2 to receive signals (such as paging messages) from the network entity NE1. In the illustrated example, UE2 transmits on subframes 1110, 1120; UE1 transmits on subframes 1140 (which includes a one symbol gap at the beginning), 1150, 1160, 1170, and 1180; and UE2 transmits on subframe 1190, which includes a one symbol gap at the beginning. On subframe 1100, both UE1 and UE2 listen for signals from NE1. UE1 and UE2 may listen to NE1 on a regular basis, such as during each subframe following the transition subframe.

Network-Initiated D2D Communication

Referring again to FIG. 8A, in an embodiment of the invention, the network entity initiates D2D communication by allocating the appropriate time-frequency resources to the UEs, which the UEs can use to communicate with one another, signaling information about the allocated resources to the UEs, and ordering the UEs to communicate directly with one another using the allocated resources. One or both of the UEs may be in idle mode at the time the D2D communication is initiated, but are already camped, so that they are known to network entity.

The time-frequency resources allocated to the UEs may be a subset of the UL resources, or may be a subset of the DL resources. For example, the network entity may allocate one or more resource blocks of a UL subframe or a DL subframe. These allocated resource blocks may occur periodically, such as every frame, subframe, or slot. Using these allocated RBs, UE1 and UE2 create a data stream, which, for example, is structured as a series of time-multiplexed subframes or slots, in which each subframe or slot uses one RB of the UL carrier or the DL carrier. The RBs of the UL or DL carriers that the UEs use may be on any subcarrier of the UL or DL carrier. In certain embodiments, however, the RBs used by the UEs are taken from the UL carrier. These RBs are selected from the PUCCH of the UL carrier and are thus located at the highest and lowest frequency subcarriers of the UL carrier.

Referring still to FIG. 8A, the carrier from which a resource is allocated for UE1 and UE2 D2D is a first carrier. The carrier that UE1 or UE2 uses to communicate with the network entity is a second carrier. Furthermore, the UE1 and UE2 may communicate in D2D mode using a third carrier that does not overlap with either the first or second carriers.

Figure 12:
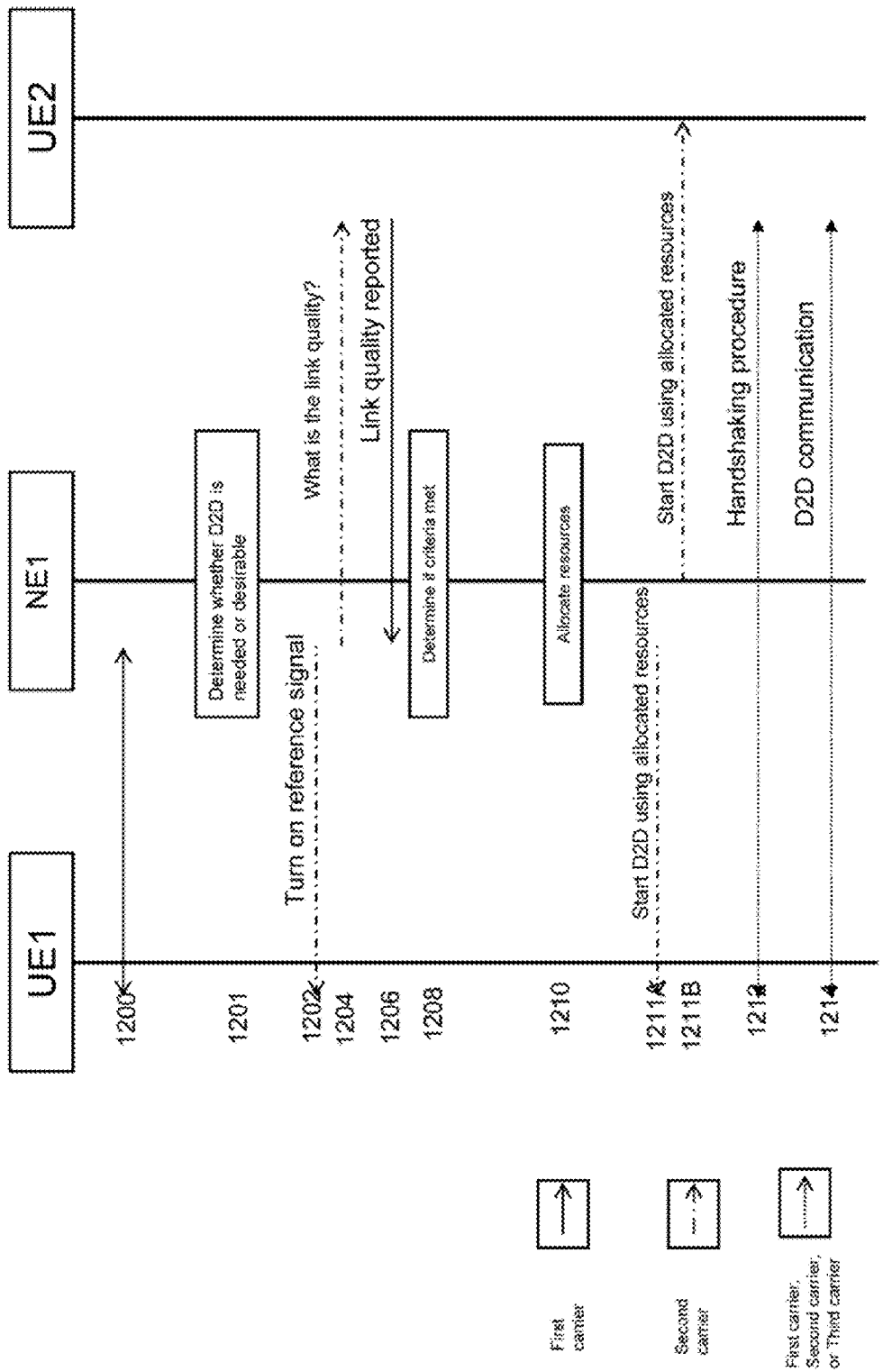
FIGS. 12, 13, 15, and 16 depict steps taken during D2D communication according to various embodiments of the invention.

Referring to FIG. 12, an example of how D2D communication is initiated by the network 100 will now be described. As noted in the figure, the UL carrier is designated as the first carrier, while the DL carrier is designated as the second carrier. At step 1200, UE1 establishes communication with NE1. This step may have been performed long before the remaining steps (e.g., via RACH). At step 1201, NE1 determines, based on one or more of the criteria set forth above, whether D2D communication between UE1 and UE2 is needed or desirable.

If NE1 determines that D2D is needed or desirable, then, at step 1202, NE1 orders UE1 to turn on its reference signal. If UE2 is connected to NE1, then, at step 1204, NE1 requests information from UE2 regarding the link quality of the reference signal as measured by UE2.

If it happened that UE2 was not connected to NE1, then NE1 could request, via the backhaul system and core 106, that UE2 connect with NE1. The core 106 may enable this by paging UE2 via another network element, such as NE2. In response to the page, UE2 would then initiate a connection to NE1.

At step 1206, UE2 determines the link quality and reports the link quality (e.g., RSRP, RSRQ, RSSI, CSI) to NE1. At step 1208, NE1 determines whether certain D2D criteria are met, such as whether (a) UE1 and UE2 are within a predetermined distance of one another, (b) the quality of the reference signal received by UE2 from UE1 is above a predetermined level, and (c) allowing UE1 and UE2 would not adversely impact public safety communications.

If NE1 makes positive determinations regarding these factors, then the process continues at step 1210, at which NE1 allocates resources for D2D (e.g., allocates PUCCH resource blocks). If NE1 makes negative determinations about any of these factors, then NE1 does not initiate D2D mode for the UEs.

At steps 1211A and 1211B, NE1 transmits a command to UE1 and UE2. The command orders the UEs to communicate with one another using D2D, and identifies to them the RBs that they should use. NE1 may transmit the command to the UEs on, for example, the PDSCH or the PDCCH/EPDCCH. At step 1212, the UEs may engage in a handshaking procedure via the resources allocated by NE1. At step 1214, the UEs communicate with each other in D2D mode. It should be noted steps 1210 and step 1211A (or 1211B) may be performed as a single step. It should also be noted that the UEs may, in various embodiments, communicate on the UL carrier, DL carrier, or a third, separate carrier.

Device-Initiated D2D Communication

In a device-initiated scheme, one or more of the UEs transmits a request to network. The request includes the identity of another UE with which the requesting UE wishes to communicate. If the network grants the request, the network responds by allocating the appropriate resources and configuring the UEs to use those resources.

For example, assume that users of UE1 and UE2 are aware of one another (e.g., they are next to each other, have discovered each other using a "finding friends" application such as Google Latitude™ or near field communication (NFC)). The user of UE1 decides to transfer a file to the user of UE2. If both UEs are not already on the network, UE1 should be able to request that UE2 be connected to UE1's network or to a common network. UE1 and UE2 can then operate on the same band/carrier, and be allocated resources from the network on which they are operating as described above.

In an embodiment of the invention, if the UEs are in idle mode then UE1 may enter a connected mode by connecting to NE1 and indicating "D2D interest" to NE1. UE1 may provide information about UE2 to NE1. Such information may include the IMEI of UE2, or handle-like information such as UE2's userid@network_name.d2d, or the like. The network entity passes this information on to the core 106 (e.g., to a billing server) (FIG. 1). One or more of the control elements checks the subscription information for both of the UEs to determine whether the data plans for the UEs include D2D capability. The core then provides a success or failure indication to NE1.

NE1 may obtain updated mobility measurements for each UE, and provide updated mobility measurements to the UEs, thereby allowing NE1 to control measurements and mobility.

In one implementation of the device initiated D2D, UE1 (in idle mode) determines that it can carry out D2D communication with UE2, using spectrum in a particular frequency band. UE1 then connects to a network entity operating in that frequency band and downloads, from the network 100, information that can be used for D2D communication, such as reference signal power, reference signal identifying information, maximum power allowed for D2D communication and other power control parameters, and the subframes that the network 100 allows UE1 to use for D2D communication. UE1 then initiates D2D (e.g., by starting to transmit a reference signal). UE2 performs similar steps and also initiates D2D. The UEs can release their connection to the network (i.e., move back to idle mode) after downloading the D2D information, and continue to communicate in a D2D mode, even though they are in idle mode with respect to the network 100. For this implementation, the network 100 may also indicate a "validity duration" associated with the information related to D2D transmission. Alternately, a predefined validity period may be assumed the UEs, and if the duration of the D2D session exceeds the validity period, the UEs may need to re-connect to the network to check if the D2D information is still valid or if they have to download new values.

The handover of a UE from NE1 to another may be delayed until after the D2D session between the UEs is complete.

According to an embodiment of the invention, UE1, upon determining that D2D may be used, autonomously initiates D2D communication in a set of uplink RBs in a frequency band containing the uplink carrier. The UE1 can determine the set of uplink RBs based on signaling received from NE1. NE1 can refrain from scheduling regular UE transmission (i.e., UE to network entity transmission) in those RBs. If NE1 does this, the UEs in D2D mode may be able to communicate with maximum power possible for D2D communication. This is useful for example, when the UE is used in a public safety scenario. For example, if the public safety UE determines that it is out of coverage from an LTE network for infrastructure based communication, it can autonomously fall back to D2D mode over a set of potentially pre-determined uplink RBs.

Figure 13:
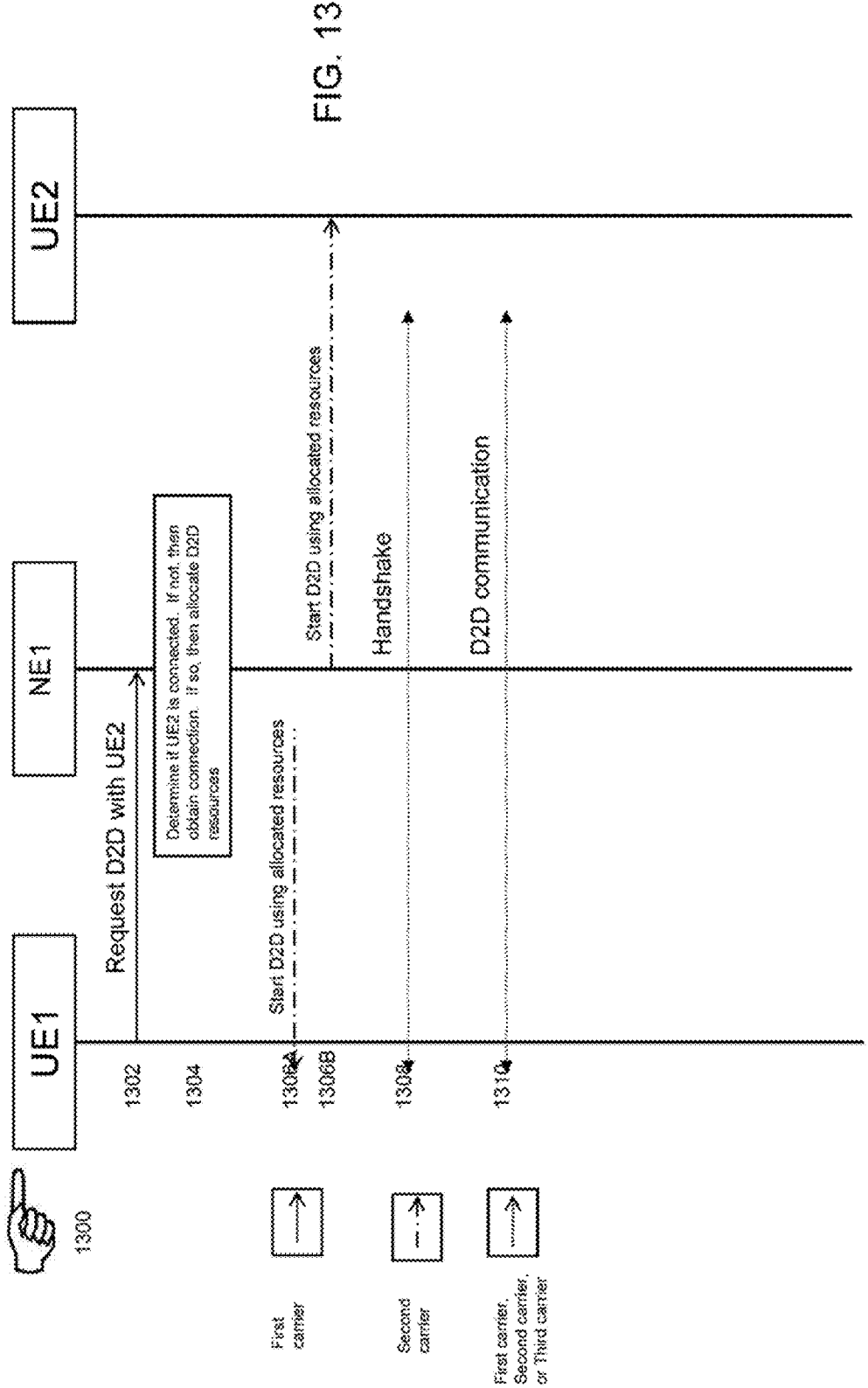

Referring to FIG. 13, an example of device initiated D2D communication will now be described. At step 1300, a user interacts with the user interface of UE1 to indicate the user's desire to engage in D2D communication. At step 1302, UE1 transmits, via a first carrier or UL carrier, a request to NE1 for D2D communication with UE2. At step 1304, NE1 determines whether UE2 is connected. If it is not, then NE1 requests, to the core 106, that UE2 be connected to NE1. If UE2 is already connected, or becomes connected in response to the request from NE1, then NE1 allocates resources (e.g., RBs from the UL carrier or the DL carrier) for use by the UEs for the D2D communication. At steps 1306A and 1306B, NE1 transmits, via a second carrier or DL carrier, information identifying the allocated resources to the UEs. At step 1308, the UEs can carry out a handshaking procedure using the allocated resources, and using a D2D subframe structure. At step 1310, the UEs communicate with one another using the D2D subframes.

UE Capabilities and Capability Partitioning

According to an embodiment of the invention, each UE has a set of one or more capabilities, i.e., a capability configuration. A capability configuration may include one or more of:
(1) the data rate (e.g., the maximum data rate) that a UE supports;
(2) how many transmit and/or receive antennas the UE has;

(3) the types of transmission schemes supported by the UE (Tables 3 and 4 show examples of transmission schemes);

(4) the soft buffer configuration of the UE;

(5) the UE's MIMO capability (e.g., supported number of layers per band, support of UL MIMO);

(6) the UE's the carrier aggregation capability (7) the UE's battery life;

(8) the maximum number of transport block bits rate per TTI supported by the UE (9) the UE's processing capability (e.g., the number of processors a UE has, the number of simultaneous processes it can execute at one time).

Each UE may, in an embodiment of the invention, divide its capabilities. Each divided set of capabilities will be referred to as a capability partitioning configuration.

As noted, one of the capabilities that a UE can partition is its soft buffer configuration. A UE's soft buffer configuration is one or more of (1) the maximum number of HARQ processes that the UE will use for receiving packets (the number of buffer partitions needed); (2) the size of a soft buffer that the UE will use for receiving packets; and (3) the number of soft channel bits that the UE will use for receiving packets. Thus, a first set of one or more of these characteristics would constitute a first soft buffer configuration, and a second set would constitute a second soft buffer configuration.

For example, given a first UE and a second UE, a first buffer partitioning configuration may include at least one of: (1) a maximum number of HARQ processes that the first UE will use for receiving from the network entity; (2) the size of a soft buffer that the first UE will use for receiving from the network entity, and (3) a number of soft channel bits that the first UE will use for receiving from the network entity.

The second buffer partitioning configuration comprises at least one of: 1) a maximum number of HARQ processes that the first UE will use for receiving from the second UE; 2) the size of a soft buffer that the first UE will use for receiving from the second UE, and 3) a number of soft channel bits that the first UE will use for receiving from the second UE.

An example of a UE dividing its capabilities into capability partitioning configurations will now be provided. If a UE has two processors and two antennas, it could divide these capabilities into a first capability partitioning configuration, which constitutes one processor and one antenna, and a second capability partitioning configuration, which constitutes one processor and one antenna.

In an embodiment of the invention, a UE uses different capability partitioning configurations for communicating with different devices. For example, a UE might communicate with a network entity using a first capability partitioning configuration of 1 processor, 4 soft buffer partitions, and in transmission mode 1. The UE might also communicate with another UE in D2D mode using a second capability partitioning configuration of 1 processor, 2 soft buffer partitions, and in D2D transmission mode. This example also illustrates a UE changing its soft buffer configuration. The first soft buffer configuration would include 4 soft buffer partitions and the second soft buffer configuration would include 2 soft buffer partitions.

In some embodiments, the UE communicates with two other devices, such as another UE and a network entity, simultaneously using both a first and a second capability partitioning configuration. In other embodiments, the UE switches from using one capability partitioning configuration to another depending on the device with which the UE is communicating, and do so in a time-multiplexed manner.

Any of the capability configurations of a UE, including those made up of one or more of the capabilities noted above, may be divided into multiple capability partitioning configurations.

Referring to FIG. 1, for example, UE1 may change its capability partitioning configuration (e.g., lower its data rate, alter number of soft buffer partitions, etc.) so that its configuration is compatible with that of UE2 so at to allow UE1 and UE2 to communicate with one another, while also supporting communication between UE1 and the network entity. UE2 may also change its capability partitioning configuration so that the capability partitioning configuration of UE1 and the configuration of UE2 are compatible.

For example, if UE1 can transmit up to 100 megabits per second, and UE2 can receive up to only 50 megabits per seconds, then UE1 may change its capability configuration so that it only transmits up to 50 megabits per second.

An example of different LTE UE categories/capabilities that UEs may have in an embodiment of the invention is shown in Table 1 (for the downlink) and Table 2 (for the uplink).

TABLE 1

| | Downlink physical layer parameter values set by the field ue-Category | | | |
|---|---|---|---|---|
| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

TABLE 2

Uplink physical layer parameter values set by the field ue-Category

| UE Category | Maximum number of UL-SCH transport block bits transmitted within a TTI | Maximum number of bits of an UL-SCH transport block transmitted within a TTI | Support for 64QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |

TABLE 3

PDCCH/EPDCCH and PDSCH configured by C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used otherwise Transmit diversity MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI Format 1A | Common and UE specific by C-RNTI | Non-MBSFN subframe: If the number of PBCH antenna ports is one, Single-antenna port, port 0 is used otherwise Transmit diversity MBSFN subframe: Single-antenna port, port 7 |
|  | DCI format 2C | UE specific by C-RNTI | Up to 8 layer transmission, ports 7-14 |

The content of Tables 1 and 2 can generally be found in "LTE; Evolved Universal Terrestrial Radio Access (E-UTRA); User Equipment (UE) radio access capabilities (3GPP TS 36.306 version 10.0.0 Release 10)" (by 3rd Generation Partnership Project (3GPP) in January 2011), Tables 4.1-1 and 4.1-2.

The content of Tables 3 can generally be found in "Technical Specification Group Radio Access Network; Evolved Universal Terrestrial Radio Access (E-UTRA); Physical layer procedures" (Release 11), (3rd Generation Partnership Project (3GPP), September 2012) Tables 7.1-5 and 7.1-6. Table 3 shows the transmissions modes used for the downlink. A UE is configured in one of the transmission modes by the network entity. A UE in a given transmission mode monitors the downlink control channels for downlink control information (DCI) format corresponding to the transmission mode and receives PDSCH based on the corresponding transmission scheme (e.g. single antenna port, transmit diversity, open loop spatial multiplexing, closed loop spatial multiplexing, beam formed transmission (single antenna port, port 7), etc).

Signaling Capabilities and Categories

According to an LTE embodiment, a UE informs a network entity of its Release, category, and additional capabilities. This allows the network entity to properly configure its communication with the UE. A UE may discard (or disregard) any received message/signal that does not conform to its release/ category/capabilities. A UE of a particular category offers the characteristics/capabilities (in the downlink and uplink) as shown in Tables 1 and 2.

During their D2D handshake process, UEs may establish a master-slave relationship. The UE having the best capability (e.g., the UE supports larger data rate, longer battery life, etc.) will generally be the master. For instance, if the two UEs participating in a D2D belong to distinct categories, then the UE with the larger category may be the master device. For example if a Category 3 and a Category 7 device participate in D2D, then the Category 7 may be the master device. The master UE will dictate the resources that are expected from the slave UE for the D2D communication. The slave UE may respond with a message indicating that it cannot provide such resources. If this occurs, the master UE may need to lower its expectations of the slave UE. For example, the slave UE may need to use at least some of its soft buffer partitions to communicate with the network entity.

Capability Exchange Example

Figure 15:
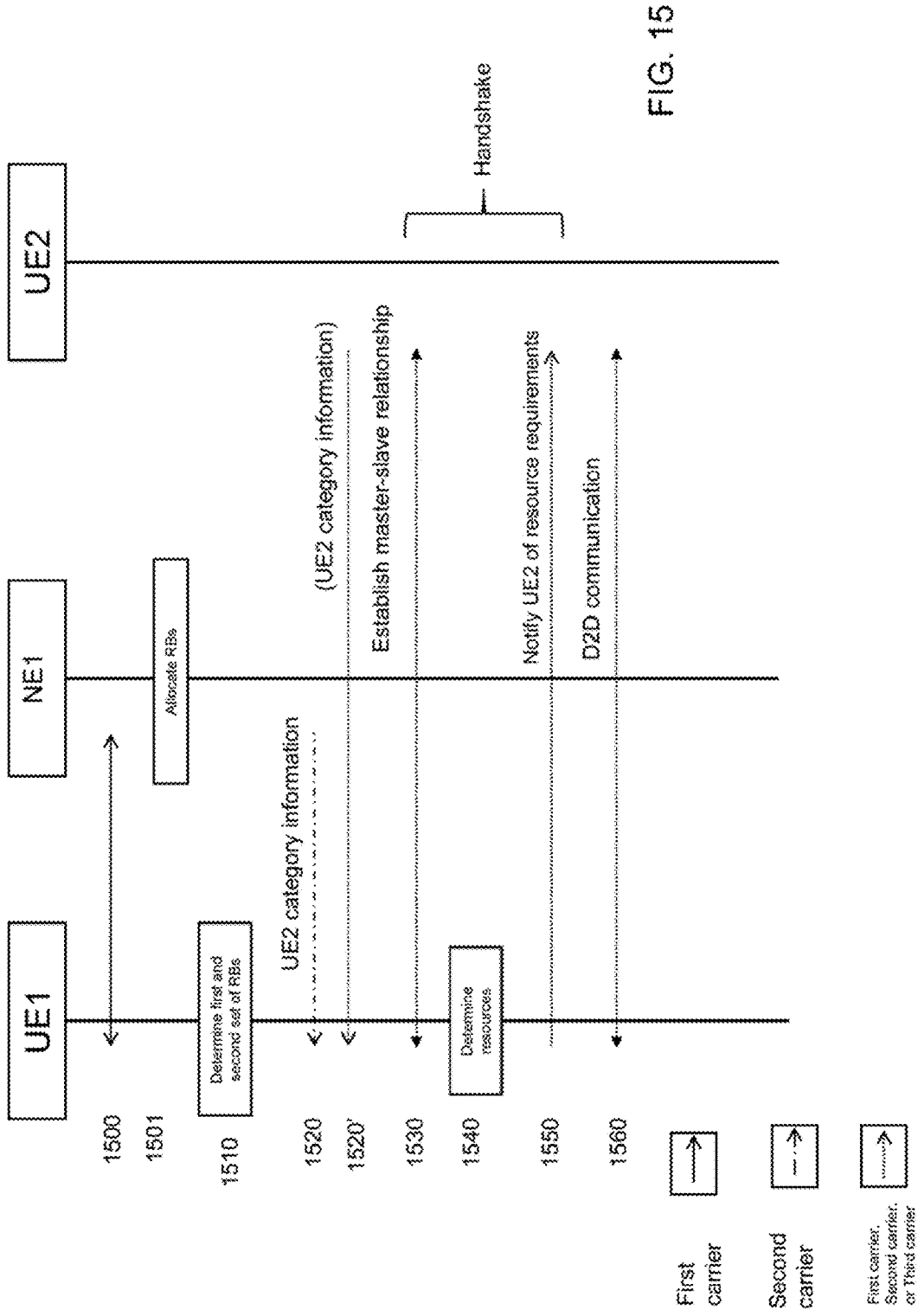

Referring to FIG. 15, an example of how UEs exchange capability information for the purpose of D2D communication will now be described. In the example, the following assumptions will be made. UE1 uses RBs from the UL carrier to transmit subframes to UE2 over a D2D carrier, using a structure such as that shown in FIG. 8B. UE1 in this example is a Category 4 UE and UE2 is a Category 2 UE. As shown in Tables 1 and 2, Category 4 UEs have DL/UL rates of 150 Mbps/50 Mbps, and Category 2 UEs have DL/UL rates of 50 Mbps/25 Mbps. Thus, the UE1-to-UE2 link has a maximum data rate of 50 Mbps (UE2 -rx), and UE2 -to-UE1 has a maximum data rate of 25 Mbps (UE2 -tx). This asymmetry is in spite of the fact that both UEs have the capability to decode 50 Mbps.

It is also assumed that the network entity has already granted UE1 authorization to engage in D2D communication with UE2, and that UE1 is aware of UE2 (UE2 may likewise be aware of UE1). These assumptions are made for the purpose of illustration only.

At step 1500, UE1 establishes communication with NE1. At step 1501, NE1 allocates RBs and/or subframes that the UEs may use to communicate with one another in D2D mode. These RBs may be RBs of the DL carrier or RBs of the UL carrier. At step 1510, UE1 determines a first set of the allocated RBs and/or subframes that the UEs will use to communicate with one another. At step 1520, UE1 receives information from NE1 regarding UE2's capabilities (e.g., UE2's category). Alternatively, at step 1520', UE2 transmits its capability information to UE1 via the D2D carrier.

UE1 and UE2 then may initiate a handshake process with one another at step 1530, in which they establish a master-slave relationship, agreeing that UE1 is the master. At step 1540, UE1 determines the appropriate configuration for the UEs to enter for communication, including what resources (e.g. capability) the UEs should allocated for D2D communication. These include the data rate, coding scheme, and HARQ buffer configuration. In this example, UE1 determines that the UE2 should devote three soft buffer partitions 1416 (in FIG. 14) for receiving transport blocks from UE1. The UE2 may then, for example, use the remaining five soft buffer partitions 1418 for communication with NE1. At step 1550, UE1 may inform the UE2 of the resources expected or the UE1 may configure the required resources of UE2 for the D2D communication. At step 1560, UE1 and UE2 communicate in D2D mode using the RBs/subframes allocated by NE1 in a D2D carrier, and using the internal resources that UE1 determined should be used. At step 1560, UE1 and UE2 engage in a D2D communication.

Figure 16:
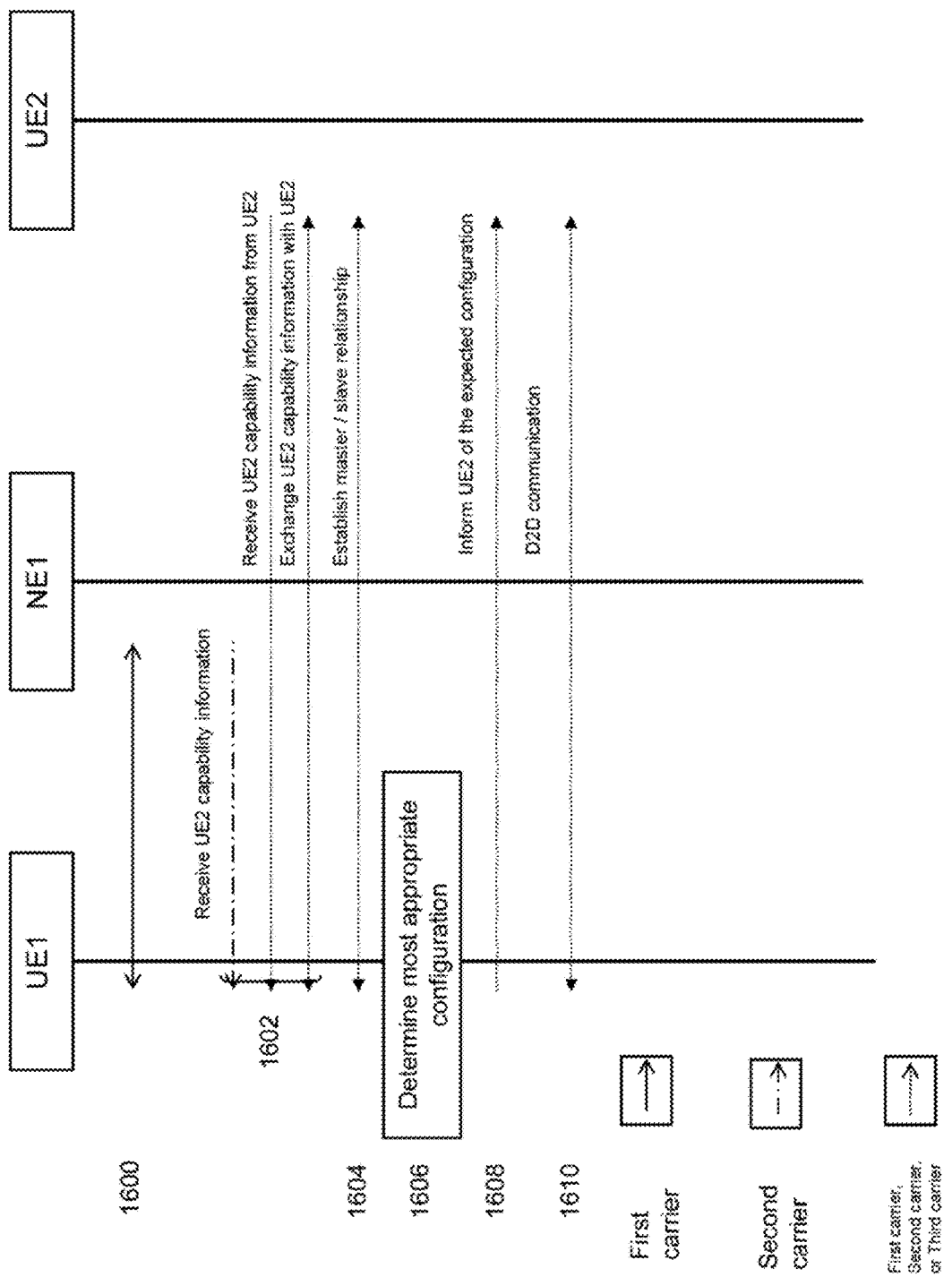

A modified version of the procedure of FIG. 15 is depicted in FIG. 16. In the procedure of FIG. 16, the user of UE1 initiates the D2D communication at step 1600. At step 1602, there are three alternatives depicted. NE1 may inform UE1 of UE2's capability, UE1 may receive capability information directly from UE2, or UE1 and UE2 may exchange capability information with one another. The remaining steps are similar to those of FIG. 15.

To further illustrate capability and category exchange during D2D communication according to an embodiment, assume that UE1 and UE2 engage in D2D communication and that UE1 is aware of the release/capability/category of UE2. UE1 will then configure the D2D link such that UE2 can properly transmit encoded messages to, and receive encoded transmissions from UE1. If the UEs are different categories, UE1 may choose its soft buffer configuration based on UE2's category. The higher category UE may be configured as the master in the D2D connection.

In another embodiment of the invention, a UE may directly signal its category to another UE when the UEs are engaged in D2D communication. Furthermore, a network entity or the master device may configure (a) the soft buffer allocation for D2D reception in the first UE and/or the HARQ buffer allocation for D2D reception in the second UE, b) the maximum number of HARQ processes for D2D transmission from the first UE to the second UE and/or the maximum number of HARQ processes configured for D2D transmission from the second UE to the first UE. Additionally, the network entity may configure one or more of the following restrictions:

a) Transmission mode restriction
b) Modulation restriction (limited to QPSK/16-QAM)
c) Bandwidth restriction (e.g. if UE1 and UE2 are operating on different BWs, UE1 is regular UE and UE2 is MTC device with a smaller Rx BW).

The network entity may signal a default configuration for the D2D communication. The signaling of the default configuration may be a cell-specific signaling or UE-specific signaling the default configuration for the direct communication may include: transmission mode for direct transmission, transmission scheme for direct transmission, demodulation RS configuration, component carrier(s) for direct communication etc. The network entity may override/re-configure some or all default configuration parameters when direct communication with another UE is enabled. The configuration may be valid for the session or used by the UE for direct communication with the other UE for certain predefined time duration. The configuration information may be reset to the default configuration within the predefined time duration on receiving a specific signaling from the network entity, transition to RRC idle mode, handover etc.

Control Channel Over-Provisioning

Referring to FIG. 7A, an example of how RBs are allocated for use by reference signals according to an embodiment of the invention will now be described. This example will focus on those RBs near the first edge 722 of the transmission bandwidth configuration. However, the same RB allocation scheme may also be applied to those RBs near the second edge 724.

It will be assumed for this example that, without any RBs being reserved for D2D, the network entity would ordinarily allocate RB0 and RB1 to UEs for transmission on the PUCCH. To facilitate D2D communication, however, the network entity instead allocates RB1 and RB2 for the PUCCH and reserves RB0 for D2D reference signaling. The network entity NE1 would, in the D2D case, provide information (e.g., via higher layer signaling, such as RRC signaling) to the UEs regarding the signal configuration of the reference signal. However, the network entity allocating in resources does not necessarily have to provide the signal configuration information. A second network entity, such as NE2, could do so.

In this example, the reference signal's signal configuration is that RB1 and RB2 are to be used for the PUCCH, and that RB0 is to be used by the UEs to transmit reference signals. This RB allocation scheme allows UEs that do not have D2D capability to use the PUCCH as they always have, but using RB1 and RB2, while the D2D-capable UEs are able to use RB0 for reference signaling in addition to using the PUCCH. Also, in many cases, the transmission power used for D2D communication is expected to be small and using the edge RBs for D2D helps in reducing interference outside the channel bandwidth.

One way in which the network entity can notify a first UE about the signal configuration of a second UE's reference signal is by transmitting information regarding the modified PUCCH RB allocations to the first UE. Such information can be in the form of a modified nRB-CQI value.

In an LTE embodiment, for example, nRB-CQI (or $N_{RB}^{(2)}$) may denote the bandwidth in terms of resource blocks that are available for use by PUCCH formats 2/2a/2b transmission in each slot in a subframe. PUCCH formats 2/2a/2b may be used for transmitting periodic CSI reports. An LTE UE could use the nRB-CQI value to determine the PUCCH resources it will use for transmitting HARQ-ACK using PUCCH format 1/1a/1b. More specifically, the LTE UE would not transmit HARQ-ACK using PUCCH format 1/1a/1b in the edge RBs identified by nRB-CQI value.

To allow D2D communication on the edge RBs of a transmission bandwidth configuration, the signal configuration information sent by the network entity can indicate an additional RB offset (e.g. D2D-RB-offset) using which D2D capable UEs can determine the edge RBs used for D2D communication. For example, if RBs of a transmission bandwidth configuration are numbered RB0, RB1, RB2, RB3, RB4 . . . with RB0 being closest to the transmission bandwidth edge, the network entity can signal a D2D-RB-offset value 2 and nRB-CQI value of 5. UEs that are not configured for D2D communication (and UEs that are not capable of D2D communication) do not transmit HARQ-ACK in the first 5 RBs starting from the edge of the transmission bandwidth configuration (i.e., RB0 to RB4). UEs that are configured for D2D communication use the first 2 RBs (i.e., RB0 and RB1) for D2D communication. The other RBs (i.e., RB2, RB3, RB4) can be used for PUCCH formats 2/2a/2b transmission by all the UEs. As seen from the example, over-provisioning the PUCCH resource value (i.e., signaling a larger value of n_RB_CQI than that needed to support PUCCH format 2/2a/2b transmissions) allows the network 100 to support D2D communication in a manner that is transparent to UEs that are not capable of supporting D2D communication. Such transparent operation may improve overall network efficiency, since UEs that supports D2D communication can share a carrier with UEs that do not support D2D communication.

In another example, it will be assumed that the carrier 700 is using a channel (e.g., channel 13) that is adjacent to a public safety channel (e.g., channel 14), and that the network entity is not permitted to use RB0, RB1 and RB2. Under these circumstances, the network entity allocates RB4 and RB5 for use by the UEs for PUCCH and allocates RB3 for D2D reference signaling.

In another embodiment of the invention, the network entity defines an RB within one or more of the first spectral emissions region 708 and the second spectral emissions region 710 (RBs 730 and 718). These regions ordinarily would not be used for data or control signaling due to limits on the power of signals in those regions (imposed by, for example, law or industry agreement) for avoiding interference to adjacent channels. However, because reference signals for D2D discovery purposes do not necessarily have to be as strong as regular control signals, the UEs may use those RBs for D2D reference signals. The interference caused by the D2D reference signals is expected to be quite small as long as the transmit power of the signals is kept a sufficiently low level.

In another embodiment of the invention, the techniques described in conjunction with FIG. 7A can be applied to an aggregated carrier 750 (FIG. 7B). Edge RBs 0 of the three component carriers 752, 754, and 756 of carrier 750 is used for D2D reference signaling, and RBs 1 and 2 is used for the PUCCH. As noted in conjunction with FIG. 7A, one or more RBs 760 may be defined within the spectral emissions mask for use by the UEs for D2D reference signaling.

In another embodiment a specific PUCCH resource index is defined to indicate which portion of the normal (e.g., Rel-8 LTE) control channels available for a given PUCCH are instead reserved for D2D reference signaling channels. Note the other normal control channels supported by a given PUCCH may be HARQ-ACK channels, SRS channels, SR channels, and Channel state information channels which include rank information and precoding feedback and channel quality feedback channels. This index could be signaled (broadcast) by higher layer signaling using a Radio Resource Control (RRC) message sent as part of a system information block. The PUCCH resource index or which of the D2D reference signaling channels to use for a UE to perform D2D reference signaling on could be determined by a field in a broadcast scheduling grant. Such a broadcast scheduling grant might also indicate which unscheduled/unassigned resource blocks in a subframe are available for random access or D2D data transmission. Such a broadcast scheduling grant may also be referred to as a contention grant. A hashing function based on user ID (e.g. such as IMSI, radio network terminal indicator) and/or subframe, slot, or radio frame index could also determine which D2D reference signaling channel to use for transmitting a given D2D reference signal. If PUCCH resources for D2D reference signaling are only to be used in specific subframes or slots in a radio frame or in specific radio frames then a subframe, slot, and/or radio frame indicator is also signaled regarding D2D reference signaling resources. The PUCCH resource index can be identified using a $\Delta_{shift}^{PUCCH}$ value, a $n_{PUCCH}^{(2)}$ value or a $n_{PUCCH}^{(2)}$. The PUCCH resource index can also be identified using a "Scheduling Request (SR) resource" value or a combination of the SR resource value and one or more of the values described above, all of which can be signaled by the network entity. The candidate set of radio resources used for D2D reference signaling may be considered common resources where one or more UEs may transmit on the resources simultaneously.

In some embodiments, configuration information regarding the reference signals can be received by a UE, from a network entity, in a DL carrier within a downlink operating band of a frequency division duplex (FDD) mode operating band. Reference signals (from another UE) can be received by the UE in a UL carrier within an uplink operating band of the FDD mode operating band. While the reference signals are received in the UL carrier of the FDD mode operating band, other data related to D2D transmission (e.g. application data of the other UE formatted for physical layer transmission) can be received in a separate carrier. The separate carrier may in a different operating band. Alternately, the other data may be received in the UL carrier within the uplink operating band of the FDD mode operating band. In some cases, the reference signal may be transmitted by the UE in a separate carrier.

After receiving a reference signal from another UE (UE2), the UE (UE1) can determine the link quality between UE1 and UE2 by measuring the reference signal and using the configuration information related to the reference signal. To determine the link quality, the UE may measure Reference Signal Received Power (RSRP), Reference Signal Received Quality (RSRQ), or Received Signal Strength Indicator (RSSI), or a Channel State Information (CSI). The UE can report the measured link quality to the network entity from which it has received the reference signal configuration information. In some cases, the UE may report the measured link quality to a different network entity. For example the UE may receive reference signal configuration information from a first transmission point but later report link quality (of a D2D link between UE and UE2) to another transmission point.

Generally UE reception of reference signal and UE reporting of link quality to the network entity occur in different subframes. For cases where the UE receives reference signals in a UL carrier of a FDD mode operating band, the UE is only expected to receive the reference signals in only those subframes where it is not scheduled to transmit on the same UL carrier.

Configuration information related to reference signals can include information identifying the subframes in which the UE is expected to receive reference signals, information identifying the resource elements in a subframe in which the UE is expected to receive reference signals, RB index of the RBs on which the UE can receive the reference signals, RB offset (e.g. D2D-RB-offset) of the RBs on which the UE can receive the reference signals, information identifying a reference signal sequence index or a reference signal cyclic shift of a reference signal associated with the reference signal.

In some embodiments, the UE may receive information regarding a maximum transmission power limit for communication on the carrier on which the UE has to transmit reference signals and/or other D2D data. In some implementations, the maximum transmission power limit can be a configured maximum UE output power $PCMAX,c$ where c is the carrier index) for the carrier on which the UE transmits reference signal and/or D2D data. The UE may also receive information related to Maximum Power Reduction (MPR) associated with D2D reference signal or other D2D data transmission. When the UE receives information related to MPR values, it can reduce its configured maximum UE output power for D2D transmission based on the MPR value. The UE can adjust the power of its reference signal and/or D2D transmissions such that power of those transmissions does not exceed the configured maximum UE output power for D2D transmissions.

The UE may receive configuration information related to reference signals from via broadcast signaling from a network entity while the UE is in idle mode. In LTE, when the UE is in idle mode, the UE performs procedures related to RRC_IDLE state. In LTE, The broadcast signaling can be included is a Master Information Block (MIB) or a System information Block (SIB).

There are many uses to which the D2D communication embodiments described herein may be put. For example, a user having a smartphone could engage in D2D communication with a D2D-capable kiosk to download movies.

The terms, descriptions and figures used herein are set forth by way of illustration only and are not meant as limitations.

For example, in the present disclosure, when two or more components are "electrically coupled," they are linked such that electrical signals from one component will reach the other component, even though there may be intermediate components through which such signals may pass.

In another example, interactions between UE1, UE2 and/or NE1 are often described as occurring in a particular order. However, any suitable communication sequence may be used.

LIST OF ACRONYMS

BS Base Station
CA Carrier Aggregation
CCE Control Channel Element
CoMP Coordinated Multi-Point
CP Cyclical Prefix
CQI Channel Quality Indicator
CRC Cyclic Redundancy Check
C-RNTI Cell RNTI
CRS Common Reference Signal
CSI Channel State Information
CSI-RS Channel State Information Reference Signal
CSS Common Search Space
D2D Device to Device
D2D-SCH D2D Shared Channel
DCI Downlink Control Information
DL Downlink
DL-SCH Downlink Shared Channel
DM-RS Demodulation Reference Signal
DFT-SOFDM Discrete Fourier Transform Spread OFDM
eNB Evolved Node B
EPBCH Enhanced Physical Broadcast Channel
EPDCCH Enhanced Physical Downlink Control Channel
EPRE Energy Per Resource Element
E-UTRA Evolved UTRA
FDD Frequency Division Duplex
FFT Fast Fourier Transform
GPS Global Positioning System
HARQ Hybrid Automatic Repeat Request
IMEI International Mobile station Equipment Identity
LBRM Limited Buffer Rate Matching
LTE Long-Term Evolution
MAC Media Access Control
MBSFN Multicast-Broadcast Single Frequency Network
MCS Modulation and Coding Scheme
MIB Master Information Block
MIMO Multiple-Input Multiple-Output
MU-MIMO Multi-User MIMO
NFC Near Field Communication
OFDMA Orthogonal Frequency Division Multiple Access
P/S-SCH Primary/Secondary Synchronization Channel
PBCH Primary Broadcast Control Channel
PCID Physical Cell Identifier
PDCCH Physical Downlink Control Channel
PDCP Packet Data Convergence Protocol
PDSCH Physical Downlink Shared Channel
PHICH Physical Hybrid ARQ Channel
PMI Precoding Matrix Indicators
PRB Physical Resource Block
P-RNTI Paging RNTI
PRS Positioning Reference Signal
PSS Primary Synchronization Signal
PTI Precoder Type Indication
PUCCH Physical Uplink Control Channel
PUSCH Physical Uplink Shared Channel
QAM Quadrature Amplitude Modulation
QPSK Quadrature Phase Shift-Keying
RACH Random Access Channel
RAT Radio Access Technology RB Resource Block
RE Resource Element
REG Resource Element Group
RF Radio Frequency
RI Rank Indicator
RNC Radio Network Controller
RNTI Radio Network Temporary Identifier
RRC Radio Resource Control
RRH Remote Radio Head
RS Reference Symbol
RSRP Reference Signal Received Power
RSRQ Reference Signal Received Quality
RSSI Received Signal Strength Indicator
SC-FDMA Single-Carrier Frequency Division Multiple Access
SFN System Frame Number
SIB System Information Block
SI-RNTI System Information RNTI
SPS Semi-Persistent Scheduling
SR Scheduling Request
S-RNTI Serving RNC RNTI
SRS Sounding Reference Signal
SSID Service Set Identifier
SSS Secondary Synchronization Signal
TDD Time Division Duplex
tm Transmission Mode
TP Transmission Point
TTI Transmission Time Interval
UE User Equipment
UERS UE-specific Reference Symbol
UL Uplink
UL-SCH Uplink Shared Channel
UMTS Universal Mobile Telecommunications System

The invention claimed is:

1. A method in a communication network entity comprising:
   communicating with a first user equipment on a carrier;
   allocating resources of the carrier, the allocated resources comprising a subframe, the subframe comprising:
      a first set of symbols configured for direct wireless transmission from the first user equipment to a second user equipment;
      a second set of symbols configured for direct wireless transmission from the second user equipment to the first user equipment; and
      a guard interval between the first and second set of symbols; and
   determining transmission modes or transmission schemes used by the first user equipment to transmit on the first set of symbols to the second user equipment,
   wherein the determination is based on an ability of the first user equipment to engage in direct wireless communication, and an ability of the first user equipment to engage in cellular communication simultaneously with engaging in direct wireless communication.

2. The method of claim 1, further comprising:
   determining a need for direct wireless communication between the first user equipment and the second user equipment based on locations of the first and second user equipments relative to one another,
   wherein the allocating step comprises allocating the resources of the carrier based on the determined need.

3. The method of claim 1, further comprising:
   determining a need for direct wireless communication between the first user equipment and the second user equipment based on a quality of a reference signal transmitted by at least one of the first and second user equipments; and
   wherein the allocating step comprises allocating the resources of the carrier based on the determined need.

4. The method of claim 1, further comprising:
   determining a need for direct wireless communication between the first user equipment and the second user equipment based on a user request for direct wireless communication between the first and second user equipments; and
   allocating the resources of the carrier based on the determined need.

5. The method of claim 1 wherein the network entity manages a macrocell and a small cell within the macrocell, the method further comprising:
   receiving a report indicating whether a cell identifier of the small cell is visible to at least one of the first user equipment and the second user equipment; and
   determining a need for the direct wireless communication between the first user equipment and the second user equipment based the report.

6. The method of claim 1, wherein the allocated resources further comprise a sequence of frames, where the subframe is included in a frame of the sequence of frames.

7. The method of claim 1, wherein the subframe comprises a plurality of resource blocks of the carrier.

8. The method of claim 1, wherein the allocated subframe is distinct from a subframe allocated to the first user equipment for communication with the network entity.

9. The method of claim 1, wherein the carrier is a first carrier, the method further comprising:
   transmitting information regarding a configuration of the subframe to at least one of the first and second user equipments via a second carrier.

10. The method of claim 1, wherein at least one of the first and second user equipments switches from transmitting data to receiving data during the guard interval.

11. The method of claim 1, wherein the carrier is an uplink carrier.

12. The method of claim 1, wherein the carrier is a downlink carrier.

13. The method of claim 1, wherein the carrier is an uplink carrier, the method further comprising transmitting data to at least one of the first and second user equipments via a downlink carrier.

14. The method of claim 13, wherein frequencies of the uplink carrier and frequencies of the downlink carrier are mutually exclusive.

15. A method, on a first user equipment, the method comprising:
   communicating with a network element on a carrier;
   engaging in direct wireless communication with a second user equipment on a subframe of the carrier, wherein the subframe comprises:
      a first set of symbols configured for direct wireless transmission from the first user equipment to a second user equipment;
      a second set of symbols configured for direct wireless transmission from the second user equipment to the first user equipment; and
      a guard interval between the first and second set of symbols;
   transmitting a request, to the network element, to engage in the direct wireless communication with the second user equipment;

receiving, from the network element, a grant of the request, wherein the grant indicates that the subframe has been allocated to the first user equipment and second user equipment for the direct wireless communication; and wirelessly communicating directly with the second user equipment on the subframe.

16. The method of claim 15, wherein the carrier is an uplink carrier, the method further comprising:

receiving information regarding a configuration of the subframe from the network element on a downlink carrier, wherein the configuration indicates locations of the first symbols, the second symbols, and the guard period within the subframe.

17. The method of claim 15, wherein frequencies of the uplink carrier and frequencies of the downlink carrier are mutually exclusive.

18. The method of claim 15,
wherein the subframe is a first subframe, the first subframe being included in at least one of a sequence of frames,
wherein at least one other subframe of the sequence includes a second subframe, the second subframe having the same configuration as the first subframe.

19. The method of claim 15, further comprising:
transmitting data to the second user equipment only within the first set of symbols of the subframe; and
receiving data from the second user equipment only within the second set of symbols of the subframe.

20. The method of claim 15, wherein the subframe comprises a plurality of resource blocks of the carrier.

21. The method of claim 15, wherein the carrier is a first carrier, the method further comprising:
receiving information regarding a configuration of the subframe from the network element via a second carrier.

22. The method of claim 15, further comprising switching from transmitting data to the second user equipment to receiving data from the second user equipment during the guard interval.

23. A method on a network entity of a wireless communication system, the method comprising:
setting up a connection with at least a first user equipment;
determining the need for direct wireless communication between the first user equipment and a second user equipment;
if it is determined that there is a need for direct wireless communication between the first user equipment and the second user equipment, assigning a sequence of repeating frames to be used for a direct wireless link between the first user equipment and the second user equipment on a carrier, wherein the frames are time-multiplexed within the sequence;
each of the repeating frames comprises a plurality of subframes;
at least one subframe of at least one of the repeating frames comprises a plurality of symbols,
a first sequence of symbols of the plurality is assigned to the first user equipment for direct transmission to the second user equipment,
a second sequence of symbols is assigned to the second user equipment for direct transmission to the first user equipment,
a third sequence of symbols functions as a transition region between the first and second sequence of symbols, the transition region being used by the first or second user equipment to switch from transmission to reception of wireless signals; and determining transmission modes or transmission schemes used by the first user equipment to transmit on the first sequence of symbols to the second user equipment,
wherein the determination is based on an ability of the first user equipment to engage in direct wireless communication, and an ability of the first user equipment to engage in cellular communication simultaneously with engaging in direct wireless communication.

24. The method of claim 23, wherein each of the plurality of subframes comprises a plurality of slots,
wherein the plurality of symbols is within a slot of the plurality subframes, and
the method further comprising assigning time-multiplexed sequence to the plurality of slots, including the slot having the plurality of symbols.

25. The method of claim 23 further comprising:
configuring when the first user equipment transmits to the second user equipment and vice versa;
providing information to the first and second user equipments regarding a transmission configuration.

26. The method of claim 23, wherein the subframe is one of a plurality of subframes of the frame, the method further comprising:
assigning a subframe of the plurality to each of the first and second user equipment, the assigned subframe being usable by each of the first and second user equipment to monitor downlink transmissions from the network entity.

27. The method of claim 23, further comprising, for each of the first and second user equipment, determining a capability of the user equipment to engage in direct wireless communication;
determining a capability of the user equipment to engage in cellular communication simultaneously with engaging in direct wireless communication; and
determining a time-multiplexing pattern of the plurality of subframes based at least in part on the determined capabilities.

28. A first user equipment comprising:
a transceiver configured to transmit information to a network element on a first carrier,
receive information from a network element on a second carrier,
wherein the information identifies resources of the first carrier that have been allocated to the first user equipment for engaging in direct wireless communication with a second user equipment, the identified resources comprising a subframe, the subframe comprising:
a first set of symbols configured for direct wireless transmission from the first user equipment to the second user equipment;
a second set of symbols configured for direct wireless transmission from the second user equipment to the first user equipment; and
a guard interval between the first and second sets of symbols; and
a memory communicatively linked to the transceiver, the memory being configured to store data representing the identified resources;
a processor communicatively linked to the memory and to the transceiver, the processor being configured to:
transmit a request, to the network element, to engage in the direct wireless communication with the second user equipment;
receive, from the network element, a grant of the request, wherein the grant indicates that the subframe has been allocated to the first user equipment and second user equipment for the direct wireless communication; and wirelessly communicate directly with the second user equipment on the subframe.

* * * * *